United States Patent
Kurani

(10) Patent No.: US 9,663,964 B2
(45) Date of Patent: May 30, 2017

(54) ADAPTABLE BASKET

(71) Applicant: Hemant Chandrakant Kurani, Riverside, CA (US)

(72) Inventor: Hemant Chandrakant Kurani, Riverside, CA (US)

( * ) Notice: Subject to any disclaimer, the term of this patent is extended or adjusted under 35 U.S.C. 154(b) by 54 days.

(21) Appl. No.: 14/808,833

(22) Filed: Jul. 24, 2015

(65) Prior Publication Data

US 2016/0023138 A1     Jan. 28, 2016

Related U.S. Application Data

(60) Provisional application No. 62/029,219, filed on Jul. 25, 2014, provisional application No. 62/148,911, filed on Apr. 17, 2015.

(51) Int. Cl.
| | | |
|---|---|---|
| *E04H 4/12* | (2006.01) | |
| *B01D 29/27* | (2006.01) | |
| *B01D 35/30* | (2006.01) | |

(52) U.S. Cl.
CPC ........... *E04H 4/1209* (2013.01); *B01D 29/27* (2013.01); *B01D 35/30* (2013.01)

(58) Field of Classification Search
CPC ........ E04H 4/1209; B01D 35/30; B01D 29/27
USPC ...................................... 210/167.1, 232, 448
See application file for complete search history.

(56) References Cited

U.S. PATENT DOCUMENTS

| | | | | |
|---|---|---|---|---|
| 3,221,882 | A * | 12/1965 | Frantz ................... | B03C 1/0332 210/223 |
| 3,358,839 | A * | 12/1967 | Simons .................. | B01D 29/15 210/232 |
| 4,133,763 | A * | 1/1979 | Cooper .................. | B01D 29/21 210/232 |
| 5,593,578 | A * | 1/1997 | Bryan .................... | B01D 29/15 210/232 |
| 6,716,342 | B1 * | 4/2004 | Tilsner .................. | E04H 4/1272 210/167.12 |
| 7,445,123 | B1 * | 11/2008 | Chiou .................... | B01D 29/33 210/223 |
| 7,531,092 | B2 * | 5/2009 | Hazlehurst ............. | B01D 35/26 210/232 |
| 8,110,099 | B2 * | 2/2012 | Hersey ................. | B01D 35/147 210/121 |
| 8,864,986 | B1 * | 10/2014 | Smith .................... | E04H 4/1272 210/167.1 |

(Continued)

*Primary Examiner* — Fred Prince
(74) *Attorney, Agent, or Firm* — Snell & Wilmer L.L.P.

(57) ABSTRACT

A basket includes a net apparatus having an annular structure and netting. The basket also includes an annular bottom piece having a top and defining a slot having a vertical portion and a horizontal portion and an annular cavity for receiving the annular structure of the net apparatus. The basket also includes an annular top piece having a horizontal component and a vertical component coupled to the horizontal component and that includes a tab for coupling to the vertical portion of the slot. The adaptable basket can be assembled by positioning the annular structure of the net apparatus within the annular cavity of the annular bottom piece, positioning the annular top piece above the annular bottom piece such that the tab is received by the vertical portion of the slot, and rotating the annular top piece such that the tab rotates away from the vertical portion of the slot.

20 Claims, 23 Drawing Sheets

(56) References Cited

U.S. PATENT DOCUMENTS

| | | | | |
|---|---|---|---|---|
| 2006/0086674 A1* | 4/2006 | Morgan | ................ | B01D 29/27 |
| | | | | 210/767 |
| 2012/0012510 A1* | 1/2012 | Ventura | ................ | E03C 1/264 |
| | | | | 210/164 |
| 2015/0343349 A1* | 12/2015 | Wells | ................ | B01D 35/147 |
| | | | | 210/232 |

* cited by examiner

DETAIL B
SCALE 2 : 1

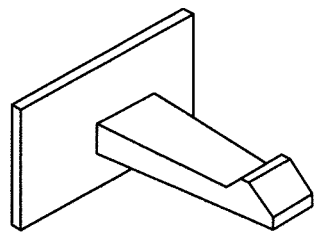
FIG. 19A-A
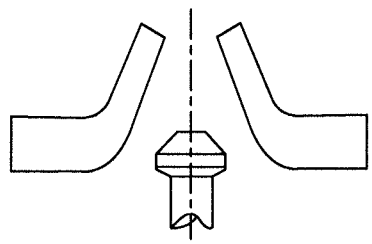
FIG. 19A-B
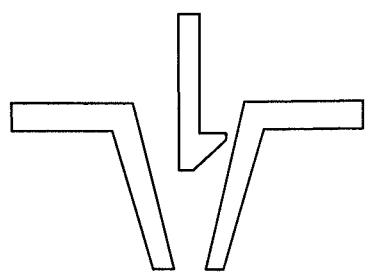
FIG. 19A-C
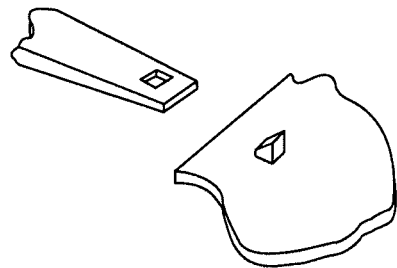
FIG. 19A-D
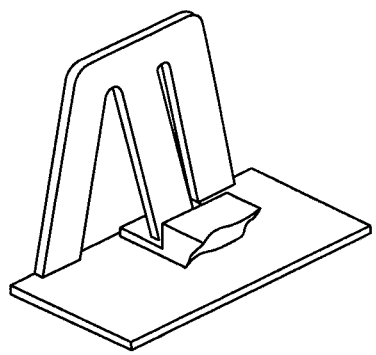
FIG. 19A-E
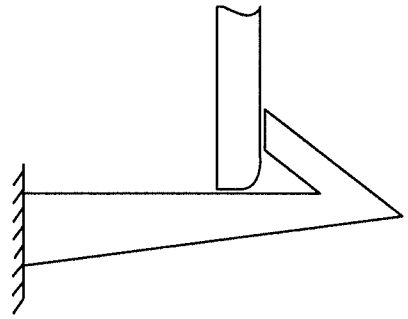
FIG. 19A-F
FIG. 19A-G
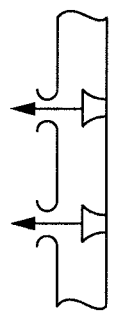
FIG. 19A-H

ADAPTABLE BASKET

This application claims the benefit and priority of U.S. Provisional Application No. 62/029,219, entitled "Adaptable Basket," filed on Jul. 25, 2014, and U.S. Provisional Application No. 62/148,911, entitled "Adaptable Basket," filed on Apr. 17, 2015, the entire contents of both applications are hereby incorporated by reference herein.

BACKGROUND

Field

The present disclosure relates to an adaptable basket for use with pool equipment and, more particularly, to an adaptable basket having various pieces removably coupled together.

Description of the Related Art

Uncovered swimming pools can undesirably collect debris, such as leaves, insects and dirt, from the environment. In order to reduce the amount of debris in the pools, many swimming pools include a pump system for filtering debris. These pump systems typically include a skimmer having a cavity and a basket therein for filtering relatively large debris. The systems further include an impeller for drawing the water from the skimmer through the system and a filter for filtering out relatively fine debris prior to returning the water to the pool. Many pump systems also include a chemical dispenser for dispensing a sanitizing compound, such as chlorine, into the pool.

Traditional skimmer baskets include a single piece of formed plastic having a structure for collecting the debris and defining openings through which the water may flow. Typically only one model of basket is provided for each size skimmer cavity having set parameters such as hole size/mesh design such that debris of various dimensions cannot be targeted. However, it is desirable to be able to collect debris of various dimensions based on factors such as a time of year. For example, during autumn, larger debris may be present (such as leafs) and during summer, smaller debris may be present (such as insects). Furthermore, from time to time, the baskets may require replacement. Because traditional baskets are provided as a single piece, the entire basket must be replaced if damaged. The single-piece construction of traditional baskets further results in a relatively high cost of shipping as a shipping container must be large enough to contain the single-piece basket.

Thus, it is desirable to have a repairable basket that can be shipped in a container having a relatively small volume and can be adjusted to collect debris of different sizes.

SUMMARY

An adaptable basket for filtering debris includes a net apparatus having an annular structure and netting attached thereto. The adaptable basket also includes an annular bottom piece having a top and defining a slot having a vertical portion being open at the top and a horizontal portion separated from the top. The annular bottom piece also defines an annular cavity for receiving the annular structure of the net apparatus. The adaptable basket also includes an annular top piece having a horizontal component and a vertical component coupled to the horizontal component. The annular top piece also includes a tab extending from the vertical component for being received by the vertical portion of the slot. The adaptable basket can be assembled by positioning the annular structure of the net apparatus within the annular cavity of the annular bottom piece, positioning the annular top piece above the annular bottom piece such that the tab is received by the vertical portion of the slot, and rotating the annular top piece with respect to the annular bottom piece such that the tab is rotated away from the vertical portion of the slot.

Another adaptable basket for filtering debris can include a first annular rigid portion having a top, a bottom and a first circumference and defining a plurality of holes and an area. The adaptable basket can also include a second annular rigid portion having a top, a bottom and a second circumference that is smaller than the first circumference and defining a plurality of holes and an area. The adaptable basket can also include a bottom portion extending radially inward from a bottom of the second annular rigid portion and substantially filling the area defined by the second annular rigid portion. The adaptable basket can also include a flexible portion coupled to the bottom of the first annular rigid portion and the top of the second annular rigid portion. The flexibility of the flexible portion allows the first annular rigid portion to move between a first location in which the bottom of the first annular rigid portion is near the top of the second annular rigid portion and a second location in which the bottom of the first annular rigid portion is near the bottom of the second annular rigid portion. When the first annular rigid portion is in the second location, at least a portion of the second annular rigid portion is positioned within the area defined by the first annular rigid portion.

Another adaptable basket for filtering debris from a pool includes an annular bottom piece having a top, a bottom and a connector. The adaptable basket also includes an annular top piece having a top, a bottom and a connector and defining an opening. The adaptable basket also includes at least two side pieces, each having a curved top having a first end, a second end and a connector configured to attach to the connector of the annular top piece. Each of the side pieces also includes a curved bottom having a first end, a second end and a connector configured to attach to the connector of the annular bottom piece. Each of the side pieces also includes a first edge extending from the first end of the curved top of the side piece to the first end of the curved bottom of the side piece. Each of the side pieces also includes a second edge extending from the second end of the curved top of the side piece to a second end of the curved bottom of the side piece. Each of the side pieces also includes an outer portion substantially filling a curved plane defined between the curved top, the curved bottom, the first edge and the second edge and defining a mesh such that fluid can flow into the adaptable basket via the opening of the annular top piece and flow out of the adaptable basket through the mesh.

BRIEF DESCRIPTION OF THE DRAWINGS

The exact nature of this invention, as well as the objects and advantages thereof, will become readily apparent upon consideration of the following specification in conjunction with the accompanying drawings in which like reference numerals designate like parts throughout the figures thereof and wherein.

DETAILED DESCRIPTION OF THE PREFERRED EMBODIMENTS

Figure 1:
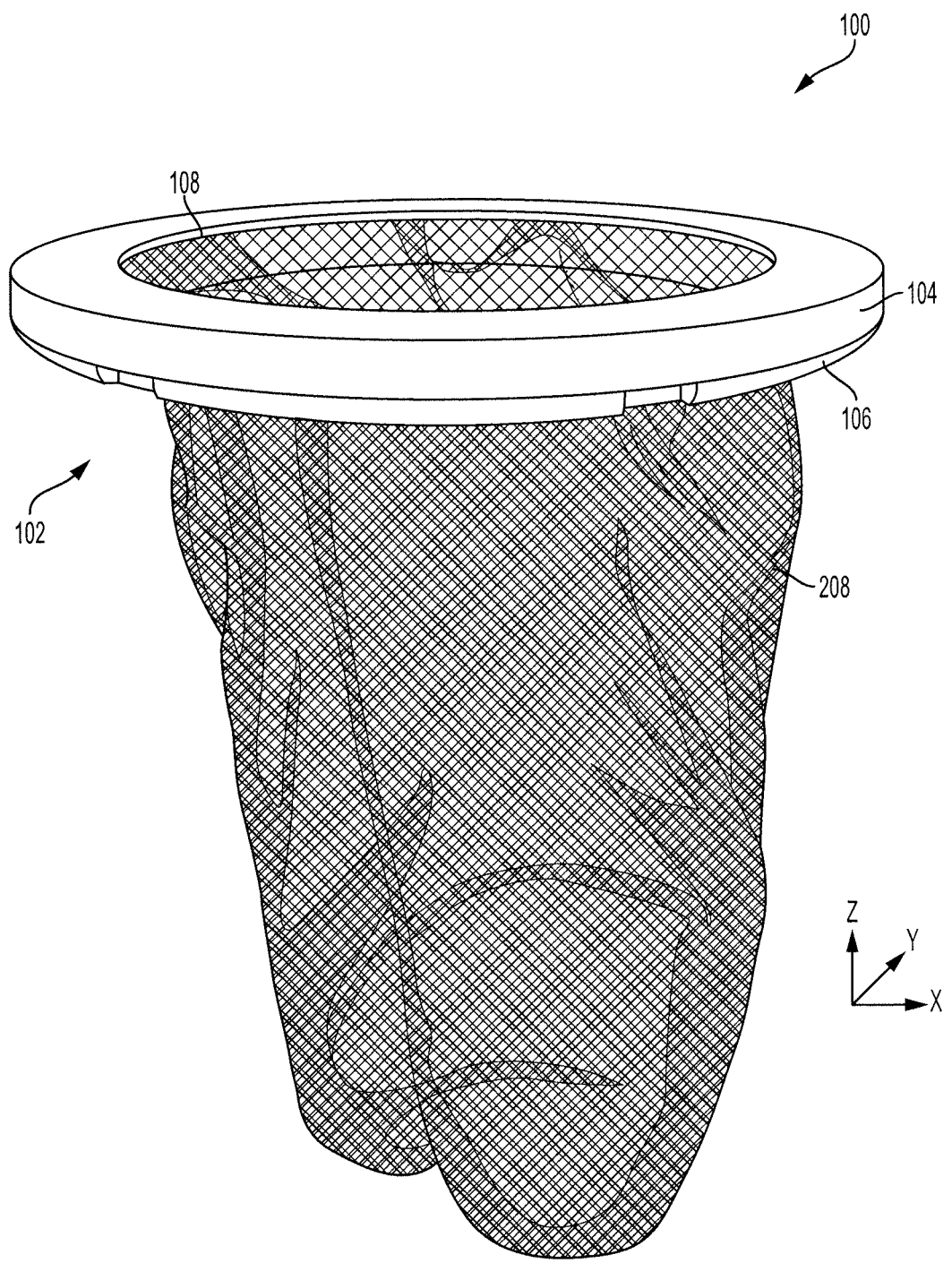
FIG. 1 is a perspective view of an adaptable basket according to an embodiment of the invention.

With reference to FIG. 1, an adaptable basket 100 may include a top piece 104, a bottom piece 106 and a net apparatus 102. An X-Y-X axis is illustrated throughout the FIGS. to show relative positioning of components. The adaptable basket 100 may be used as a skimmer basket in a skimmer cavity of a swimming pool of an in-pool skimmer system, an above-ground skimmer system, or may be used as a pump basket in a pool pump system. Furthermore, use of the adaptable basket 100 is not limited to a pool—it may be used to filter debris in any aquatic environment in which a pump is utilized.

Debris can collect within the pump system and cause a loss of prime. Skimmer baskets reduce the likelihood of these clots by filtering relatively large debris prior to it entering the pump system. Any reference to a basket herein may therefore be assumed to reference a basket for any pool system which utilizes a filter basket. For example, reference to a basket for an in-pool skimmer may also refer to a basket for an above ground skimmer, a pool pump system, any other in-line filtering mechanism before a pump and/or a vacuum system.

In some embodiments, fluid received by a skimmer may flow through an opening 108 defined by the top piece 104 and/or the bottom piece 106 and flow through the net apparatus 102 prior to reaching an impeller. Because the net apparatus 102 includes a mesh defining openings 208, fluid can flow through the net apparatus 102. However, debris having dimensions larger than the openings 208 of the net apparatus 102 cannot pass through the net apparatus 102 and thus cannot reach the impeller. Accordingly, as water and debris are received by the skimmer, the fluid continues to flow through the pump system while the debris is collected by the adaptable basket 100.

Figure 2:
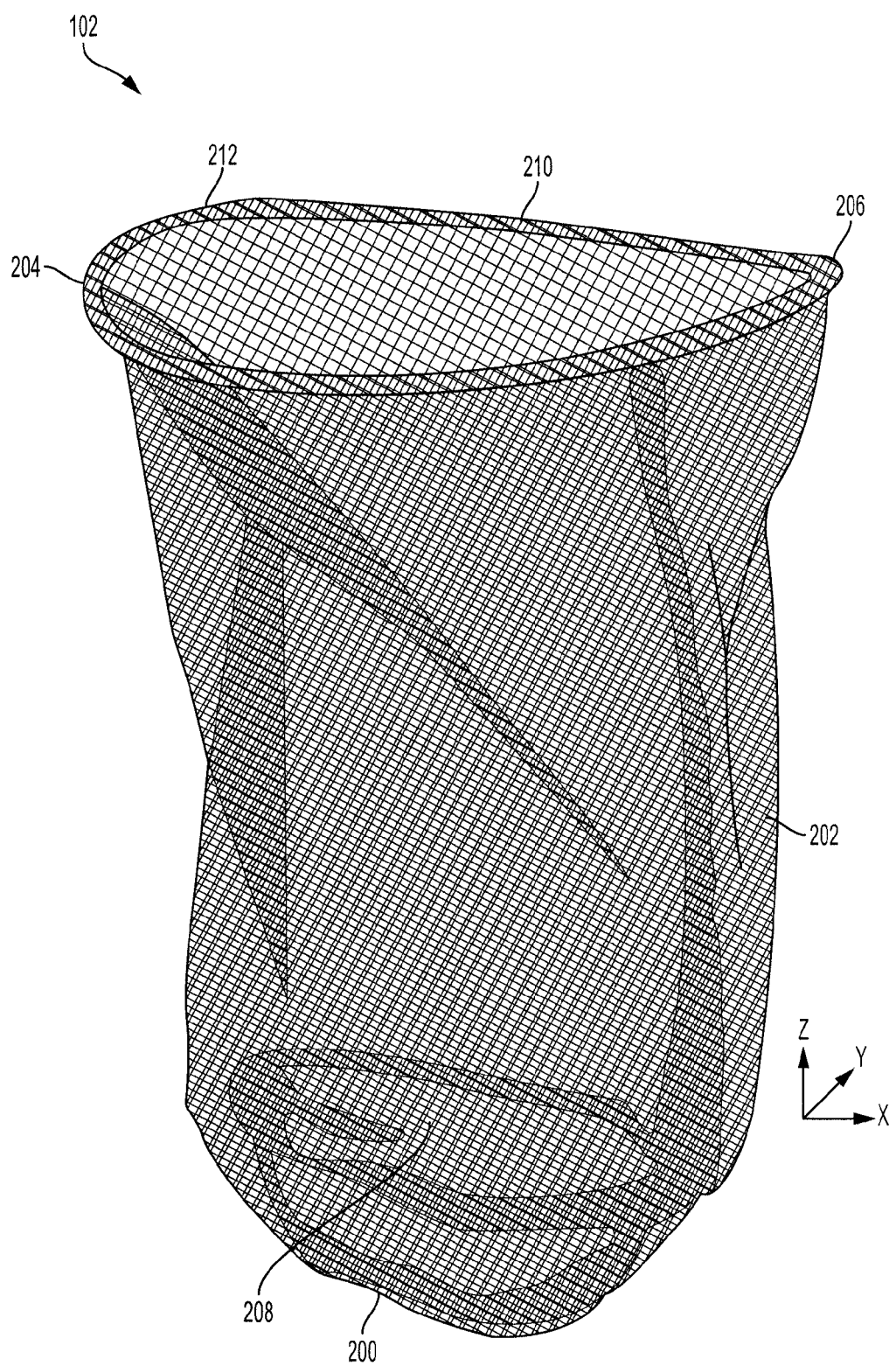
FIG. 2 is a perspective view of a net apparatus of the adaptable basket of FIG. 1 according to an embodiment of the invention.

With reference now to FIG. 2, the net apparatus 102 has a top 204 and a bottom 200 and may include netting 202 and a bendable rod 206. With brief reference to FIGS. 1 and 2, the top 204 is coupled to the top piece 104 and the bottom piece 106 of the adaptable basket 100. For example, the bendable rod 206 may be positioned between and coupled to the top piece 104 and the bottom piece 106.

Returning reference to FIG. 2, the bottom 200 of the net apparatus 102 includes reinforced netting. In some embodiments, this may include two, three or more layers of the netting 202. In some embodiments, different netting or a different material altogether, such as a solid layer of plastic, may be coupled to the bottom 200 of the net apparatus 102.

The netting 202 defines a plurality of openings 212. Based on the particular netting used, the openings 212 may have any of a variety of dimensions. With brief reference to FIGS. 1 and 2, many net apparatuses and/or netting 202 may be provided with the adaptable basket 100, each serving a different purpose. For example, a first net apparatus or netting may be provided having openings of a first dimension and a second net apparatus or netting may be provided having openings of a second dimension that is smaller than the first dimension. During times when large debris may appear in the pool, it may be desirable to use the net apparatus having the larger openings so that the larger debris does not reduce water flow through the netting. However, in times when less large debris is present in the pool, it may be desirable to use the net apparatus having the smaller dimensions in order to collect more of the smaller debris.

Figure 3:
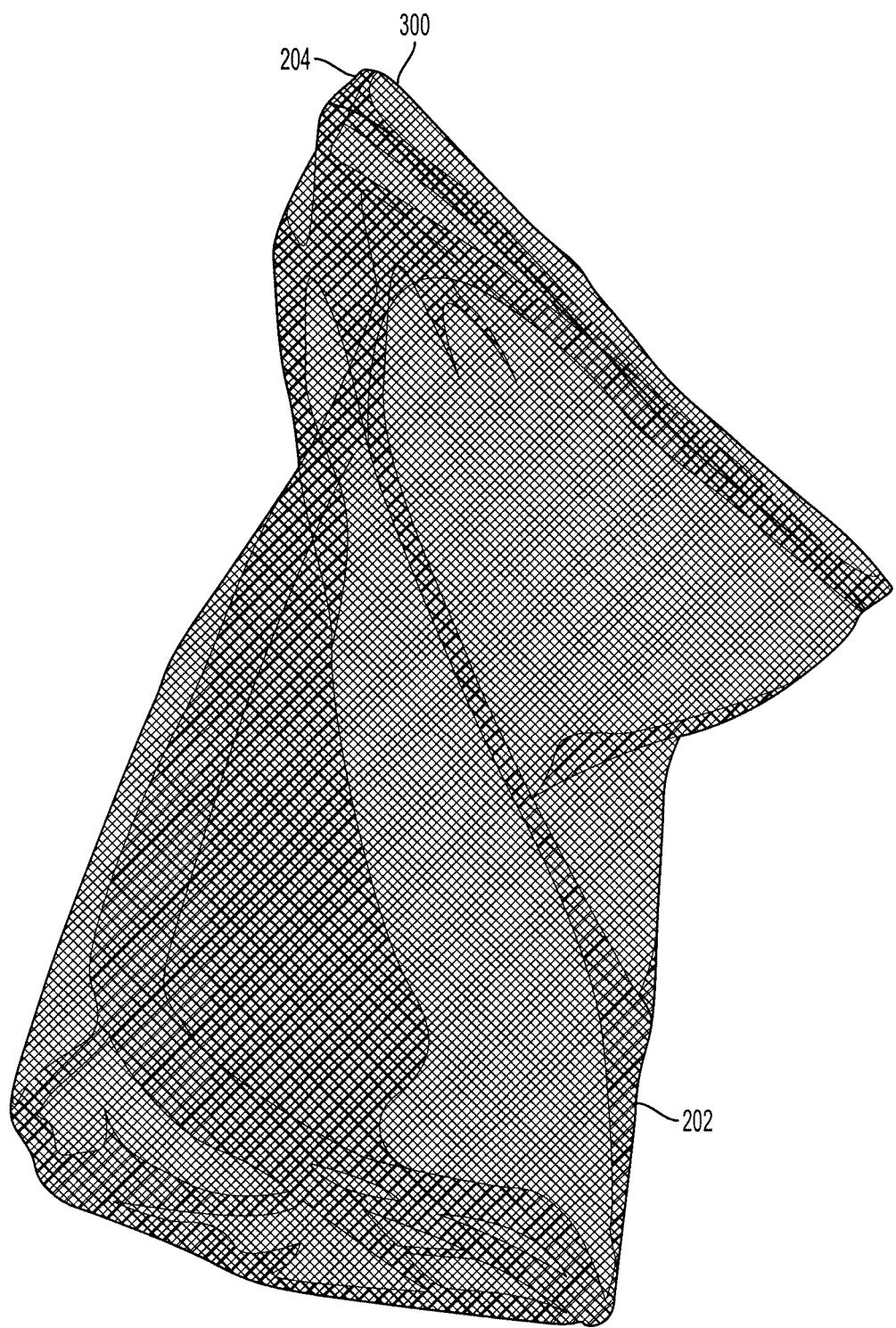
FIG. 3 is a perspective view of a netting of the net apparatus of FIG. 2 according to an embodiment of the invention.
Figure 4:
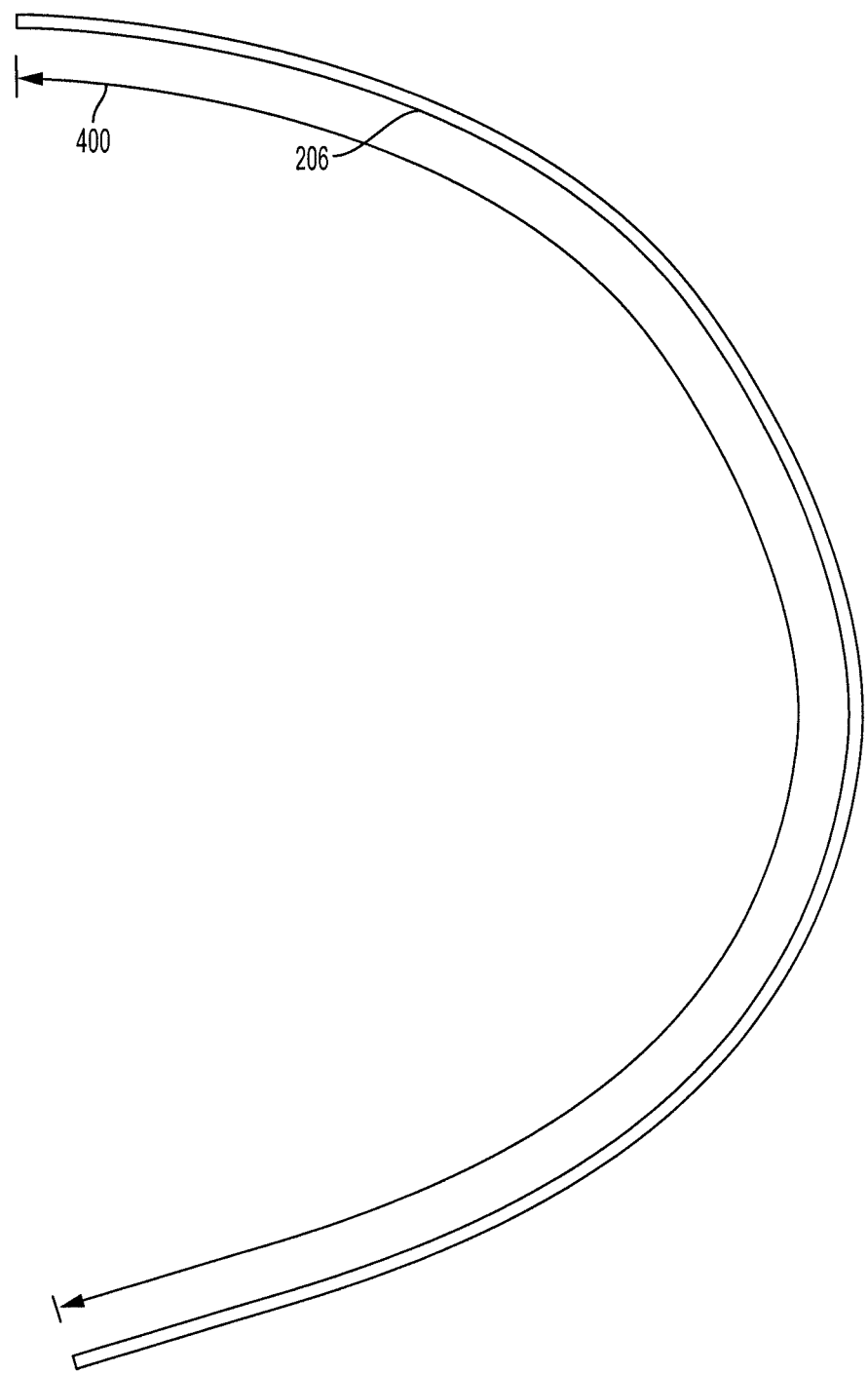
FIG. 4 is a perspective view of a bendable rod of the net apparatus of FIG. 2 according to an embodiment of the invention.

With reference now to FIGS. 2, 3 and 4, the bendable rod 206 may be removable from the netting 202. In that regard, the netting 202 may include a loop 300 at the top 204. The loop 300 may include a double layer of netting such that the bendable rod 206 may fit between the two layers of netting. In some embodiments, the bendable rod 206 may be coupled to the netting 202 in a different manner and may or may not be removable. In some embodiments, the bendable rod 206 may be replaced with a rigid annular loop to which the netting 202 may be coupled.

The top 204 of the netting 202 may have a circumference 210. Similarly, the bendable rod 206 may have a length 204. In some embodiments, the length 400 may be within five percent (5%), within 10% or within 20% of the circumference 210. This allows the bendable rod 206 to be coupled to the netting 202 and substantially support the netting 202 about the circumference 210.

Returning reference to FIG. 1, the top piece 104 and/or the bottom piece 106 may comprise any material. In some embodiments, the top piece 104 and/or the bottom piece 106 may comprise a metal, a wood, plastic or another composite material. For example, the top piece 104 and/or the bottom piece 106 may include fiberglass, a resin, and/or polytetrafluoroethylene (PTFE, also known by the trade name Teflon™). The top piece 104 and/or the bottom piece 106 may be formed using any type of molding such as compression molding, injection molding, or the like. With brief reference to FIG. 3, the netting 202 may include a plastic or other composite such as nylon, polypropylene or the like.

Figure 5:
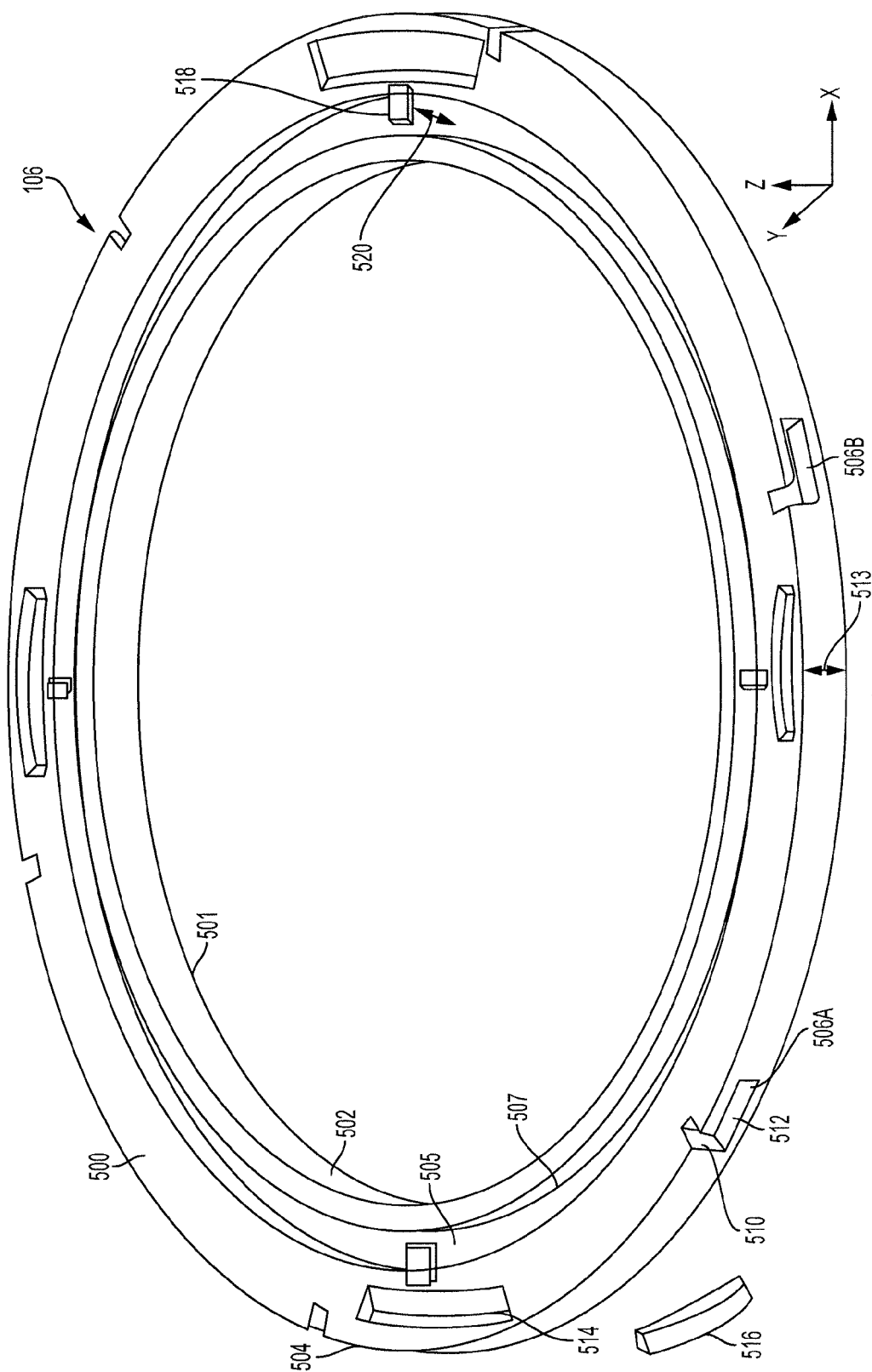
FIG. 5 is a perspective view of a bottom piece of the adaptable basket of FIG. 1 according to an embodiment of the invention.

Turning now to FIG. 5, the bottom piece 106 may have a top 500, a bottom 501, an inner surface 502 and an outer surface 504. The bottom piece 106 may define an annular cavity 505. With reference now to FIGS. 2 and 5, the annular cavity 505 may have a circumference 507 that is substantially the same as the circumference 210 of the net apparatus 102 such that the circumference 507 may be within 5%, within 10% or within 20% of the circumference 210 of the top 204 of the net apparatus 102. In that regard, the top 204 of the net apparatus 102, including the bendable rod 206, may be positioned within the annular cavity 505 of the bottom piece 106.

In some embodiments, the bottom piece 106 may include one or more retaining tabs including a retaining tab 518. The retaining tab 518 may extend over the annular cavity 505. In that regard, when the net apparatus 102 is positioned within the annular cavity 505, the retaining tab 518 will resist separation of the net apparatus 102 from the bottom piece 106. In some embodiments, the retaining tab 518 may rotate with respect to the top 500. In that regard, the top 204 of the net apparatus 102 may be positioned in the annular cavity 505 while the retaining tab 518 is rotated away from the annular cavity 505. When the top 204 is positioned within the annular cavity 505, the retaining tab 518 may be rotated to a position over the annular cavity 505 such that the top 204 of the net apparatus 102 resists separation.

With reference now to FIGS. 1, 2 and 5, when the top 204 of the net apparatus 102 is positioned within the annular cavity 505, the top piece 104 of the adaptable basket 100 may be coupled to the bottom piece 106. The top piece 104 substantially covers the annular cavity 505 such that the net apparatus 102 is coupled to the top piece 104 and the bottom piece 106 when the top piece 104 is coupled to the bottom piece 106.

With reference now to FIGS. 1 and 5, a force (such as motion of the fluid within the pool or force due to the difference in density of the adaptable basket 100 and the fluid) may be exerted on the adaptable basket 100 in an upward direction (i.e., the positive Z direction). In that regard, the bottom piece 106 may define one or more weight cavities such as a weight cavity 514 that is adapted to receive a material having a greater area density than other components of the adaptable basket 100, such as a weighted bar 516. The weighted bar 516 may include a metal or any other substance having a greater area density than the bottom piece 106. When the top piece 104 is coupled to the bottom piece 106, the weighted bar 516 may be coupled in place between the top piece 104 and the bottom piece 106. Accordingly, the weighted bar 516 will exert a downward force on the adaptable basket 100, opposing the upward force on the adaptable basket 100.

In some embodiments, the weighted bar 516 may have any shape. For example, the weight cavity 514 and the weighted bar 516 may be annular. Use of these embodiments evenly distributes weight about the circumference of the bottom piece 106. In some embodiments, the weighted bar 516 may be permanently coupled to the bottom piece 106 and/or the top piece 104 such as, for example, by being molded or otherwise formed within the respective part. In some embodiments, the bottom piece 106 may include tabs for restraining movement of the weighted bar 516 relative to the bottom half 106.

Some skimmer cavities may have different shapes and sizes. In that regard, top pieces, bottom pieces and net apparatuses may be provided having different shapes and dimensions such that a combination of a top piece, a bottom piece, and a net apparatus can be combined to create a basket to fit within any skimmer cavity.

The bottom piece 106 may define one or more slots 506 including a slot 506A having a vertical portion 510 that is open on the top 500 and on the outer surface 504 and a horizontal portion 512 that is open on the outer surface 504. The slot 506A may receive a tab 1012 (shown in FIG. 10) of the top piece 104, effectively coupling the top piece 104 to the bottom piece 106. In some embodiments, the top piece 104 may be coupled to the bottom piece 106 using any type of connection such as, but not limited to, a snap connector such as those illustrated in FIGS. 19A-A-19C, a spring clip, a button, a dowel, screw threading or the like.

Figure 6:
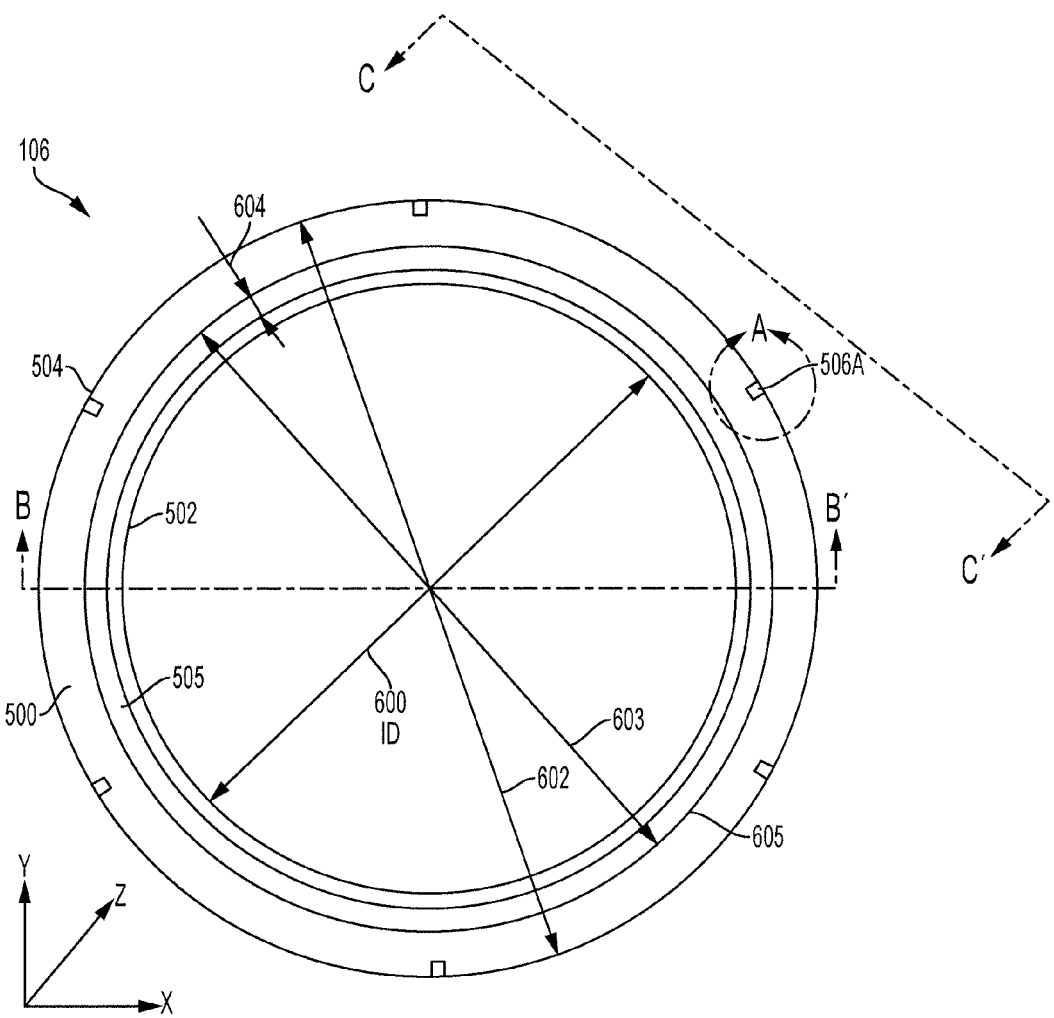
FIG. 6 is a top-down view of the bottom piece of FIG. 5 according to an embodiment of the invention.

With reference now to FIG. 6, a view from the top 502 of the bottom piece 106 (i.e., along the Z axis) illustrates the annular nature of the bottom piece 106. The bottom piece 106 may have an inner diameter 600 and an outer diameter 602 that is larger than the inner diameter 600. In some embodiments, the inner diameter 600 may be 160 millimeters and the outer diameter 602 may be 204 millimeters.

The outer surface 605 of the annular cavity 505 may also have a diameter 603. In some embodiments, the diameter 603 may be 180 millimeters. The annular cavity 505 may have a width 604 which, in some embodiments, may be 6 millimeters.

Figure 7:
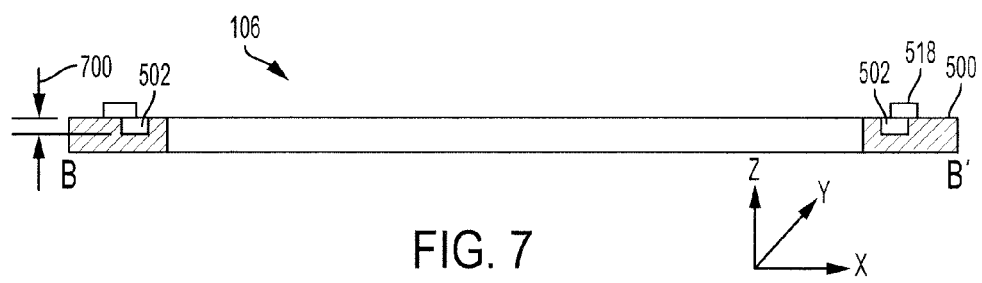
FIG. 7 is a cross-sectional view of the bottom piece of FIG. 5 according to an embodiment of the invention.

With reference now to FIGS. 6 and 7, a cross-sectional view of the bottom piece 106 along the line B-B' (i.e., along the Y axis) illustrates aspects of the annular cavity 505 and the retaining tab 518. The retaining tab 518 may at least partially cover the top of the annular cavity 505. The annular cavity 505 may extend a distance 700 in the Z direction from the top 500 into the bottom piece 106. In some embodiments, the distance 700 may be 4 millimeters.

Figure 8:
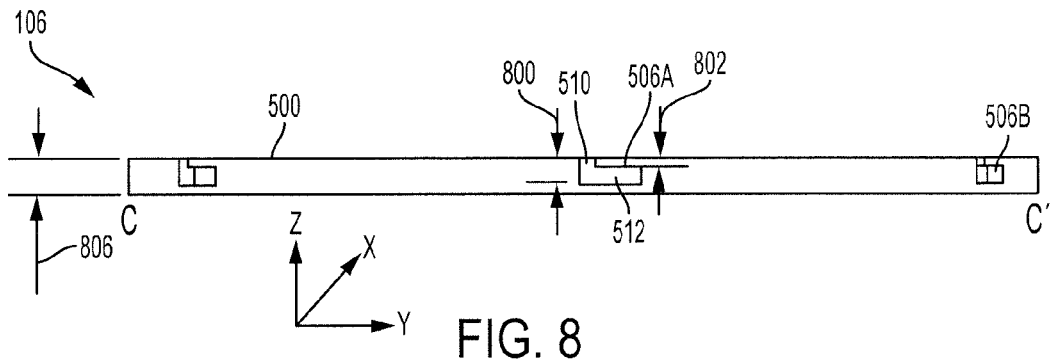
FIG. 8 is a side view of the bottom piece of FIG. 5 according to an embodiment of the invention.

With reference now to FIGS. 6 and 8, a view of the portion A of FIG. 6 illustrates the slot 506A. The vertical portion 510 extends a distance 800 into the bottom piece 106 from the top 500. In some embodiments, the distance 800 may be 6 millimeters. In some embodiments, the horizontal portion 512 may begin a distance 802 from the top 500. In some embodiments, the distance 802 may be 2 millimeters. The bottom piece 106 may have a thickness 806 in the Z direction. In some embodiments, the thickness 806 may be 8 millimeters.

Figure 9:
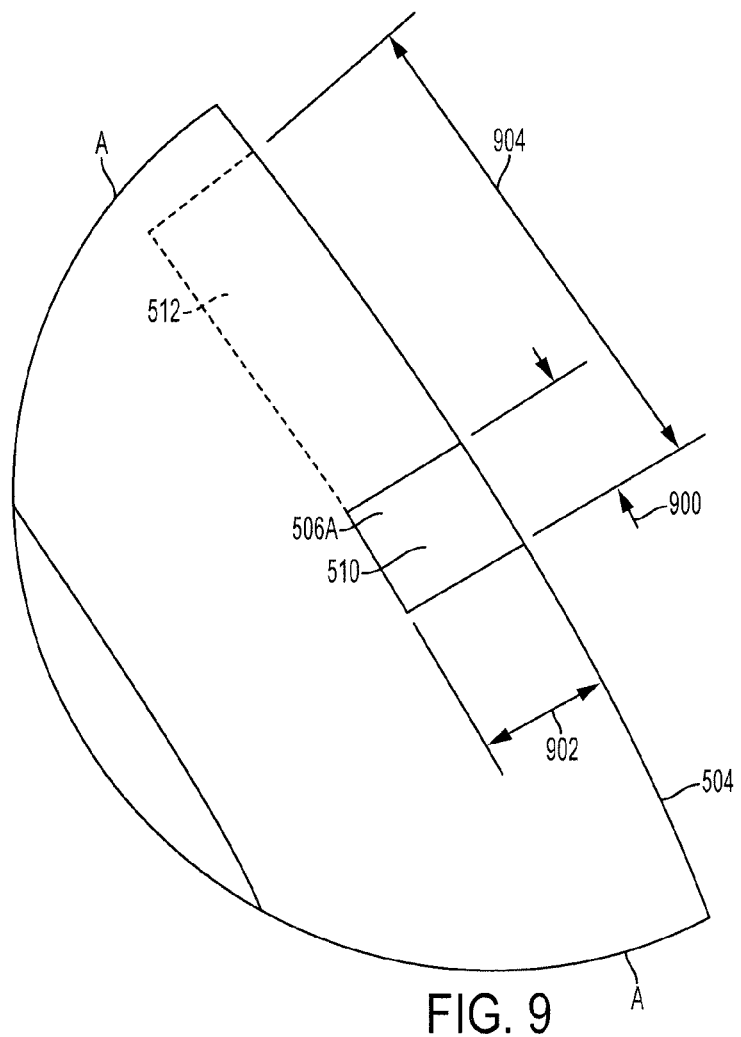
FIG. 9 is an enlarged side view of a portion of the bottom piece of FIG. 5 according to an embodiment of the invention.

With reference now to FIGS. 6 and 9, the vertical portion 510 of the slot 506A may circumferentially extend an amount 900. In some embodiments, the amount 900 may be two degrees (2°) along the circumference of the bottom piece 106. Similarly, the horizontal portion 512 may extend an amount 904 circumferentially along the bottom piece 106. In some embodiments, the amount 904 may be 8°. The vertical portion 510 may extend radially inward from the outer surface 504 a distance 902. In some embodiments, the distance 902 may be 4 millimeters.

Figure 10:
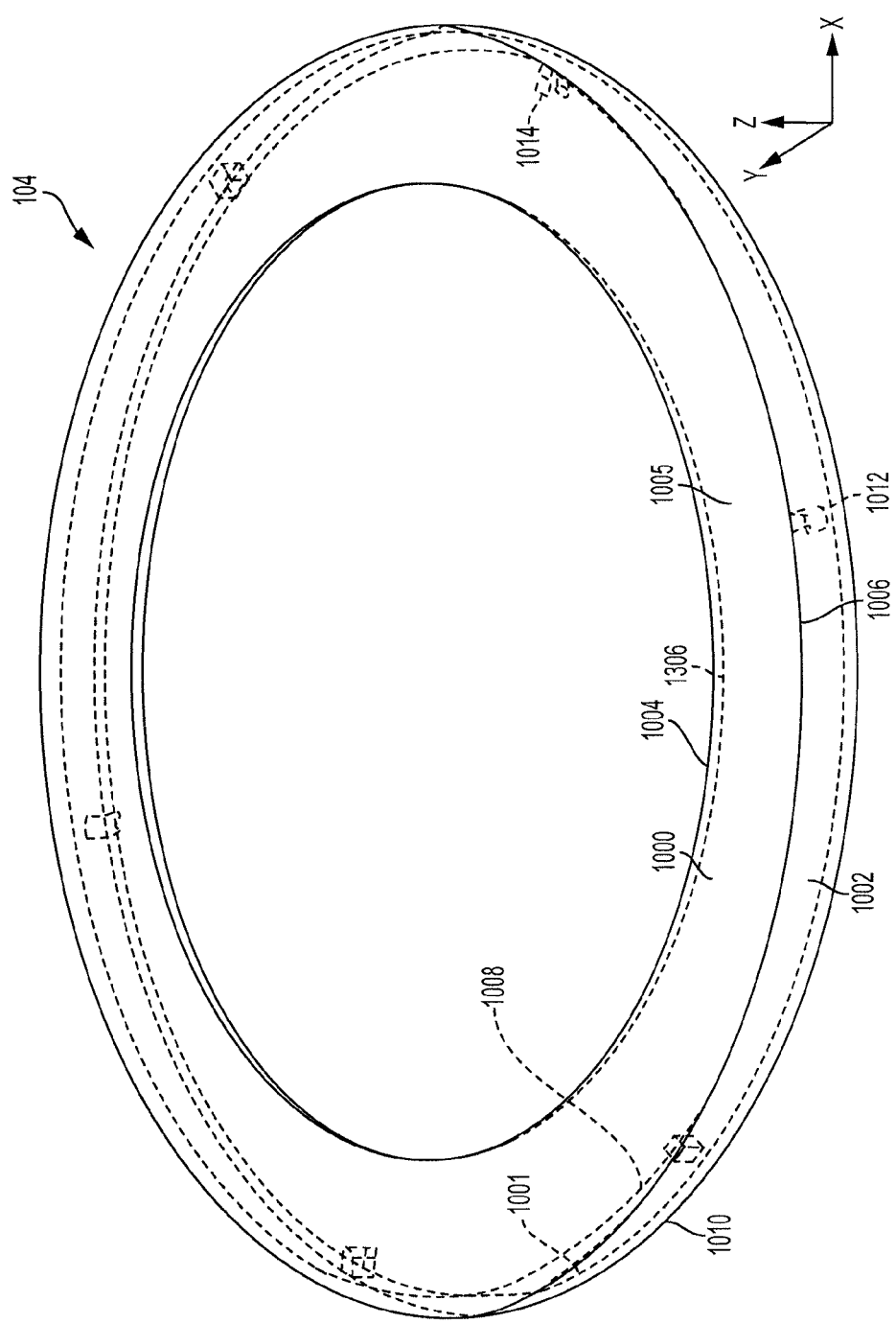
FIG. 10 is a partially-transparent perspective view of the top piece of the adaptable basket of FIG. 1 according to an embodiment of the invention.

With reference now to FIG. 10, the top piece 104 may have a top 1005 and a bottom 1001. The top piece 104 may also include a horizontal component 1000 and a vertical component 1002. The vertical component 1002 may be coupled to the horizontal component 1000. The horizontal component 1000 and the vertical component 1002 may be manufactured as a single piece of material or as separate pieces of material and coupled together. The horizontal component 1000 may have a larger distance in the X direction than the vertical component 1002 has in the X direction. Similarly, the vertical component 1002 may have a larger distance in the Z direction than the horizontal component 1000 has in the Z direction.

The horizontal component 1000 may have an inner horizontal surface 1004 and an outer horizontal surface 1006. Similarly, the vertical component 1002 may have an inner vertical surface 1008 and an outer vertical surface 1010.

In some embodiments, the horizontal component 1000 may define a plurality of openings including an opening 1014. In some embodiments, the opening 1014 may not exist. In some embodiments, one or more tabs including a tab 1012 may be coupled to the inner vertical surface 1008 of the vertical component 1002. The tab 1012 may extend radially inward toward a center of the top piece 104 from the inner vertical surface 1008.

With reference now to FIGS. 5 and 10, the top piece 104 may be positioned adjacent the bottom piece 106 such that the tab 1012 is positioned above the slot 506A. A downward force may be exerted on the top piece 104 relative to the bottom piece 106 to cause the tab 1012 to be received by the vertical portion 510. When the vertical portion 510 has fully received the tab 1012, the top piece 104 may be rotated relative to the bottom piece 106. This rotation of the top piece 104 causes the tab 1012 to be positioned within the horizontal portion 512 of the slot 506A and not within the vertical portion 510. This restricts motion of the top piece 104 in the Z direction relative to the bottom piece 106. The top piece 104 is then coupled to the bottom piece 106 and should remain so until the top piece 104 is rotated back with respect to the bottom piece 106 and a force is exerted on the bottom piece 106 away from the top piece 104.

Figure 11:
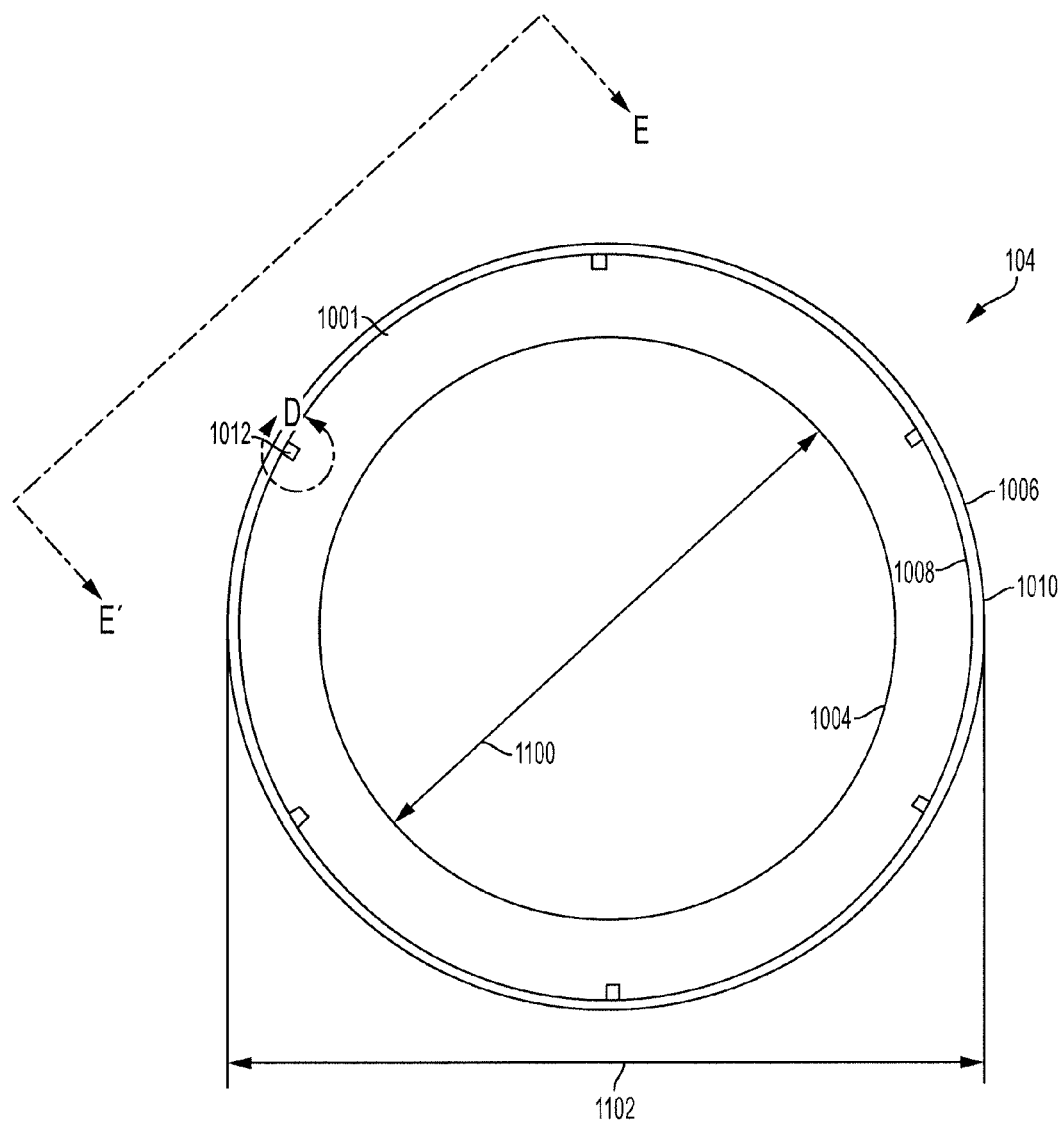
FIG. 11 is a top-down view of the top piece of FIG. 10 according to an embodiment of the invention.

With reference now to FIG. 11, a bottom view of the top piece 104 illustrates aspects of the tab 1012. The top piece 104 may have an inner diameter 1100 and an outer diameter 1102 that is greater than the inner diameter 1100. The inner diameter 1100 may be measured from the inner horizontal surface 1004. In some embodiments, the inner diameter 1100 may be 160 millimeters. The outer diameter 1102 is the diameter measured from the outer horizontal surface 1006, which may be the same as the outer vertical surface 1010. In some embodiments, the outer diameter 1102 may be 210 millimeters.

Figure 12:
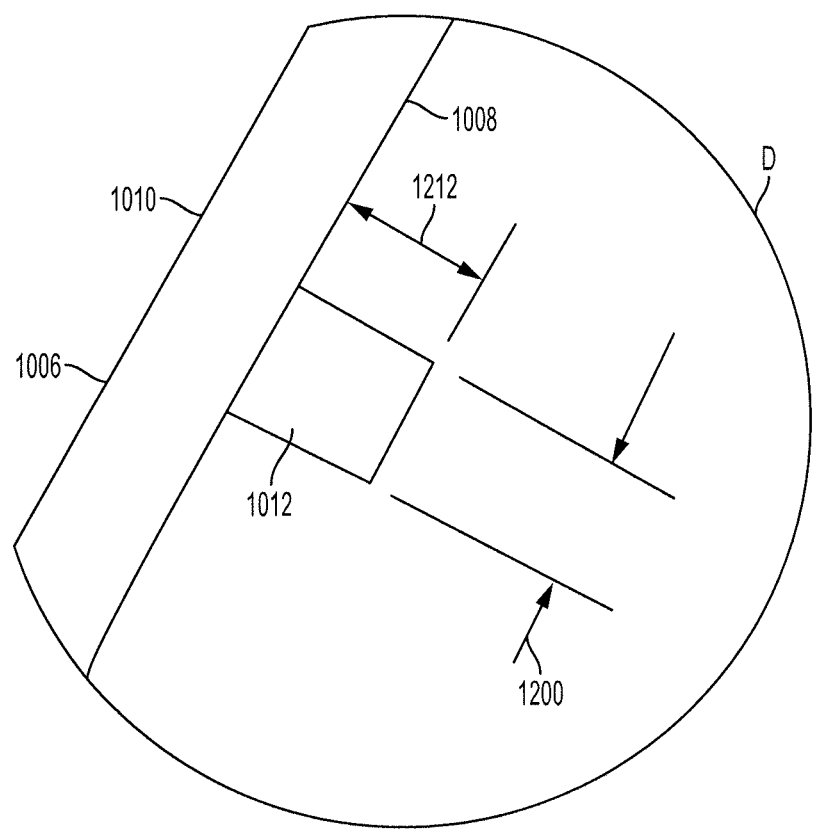
FIG. 12 is an enlarged top-down view of a portion of the top piece of FIG. 10 according to an embodiment of the invention.
Figure 12:
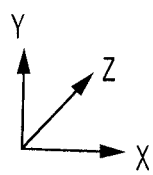

With reference now to FIGS. 11 and 12, the portion of the top piece 104 illustrated by the letter D shows various measurements of the tab 1012. The tab 1012 may extend a distance 1212 towards a center of the top piece 104 from the inner vertical surface 1008. In some embodiments, the distance 121 may be 4 millimeters. The tab 1012 may extend an amount 1200 circumferentially about the top piece 104. In some embodiments, the amount 1200 may be 2°.

Figure 13:
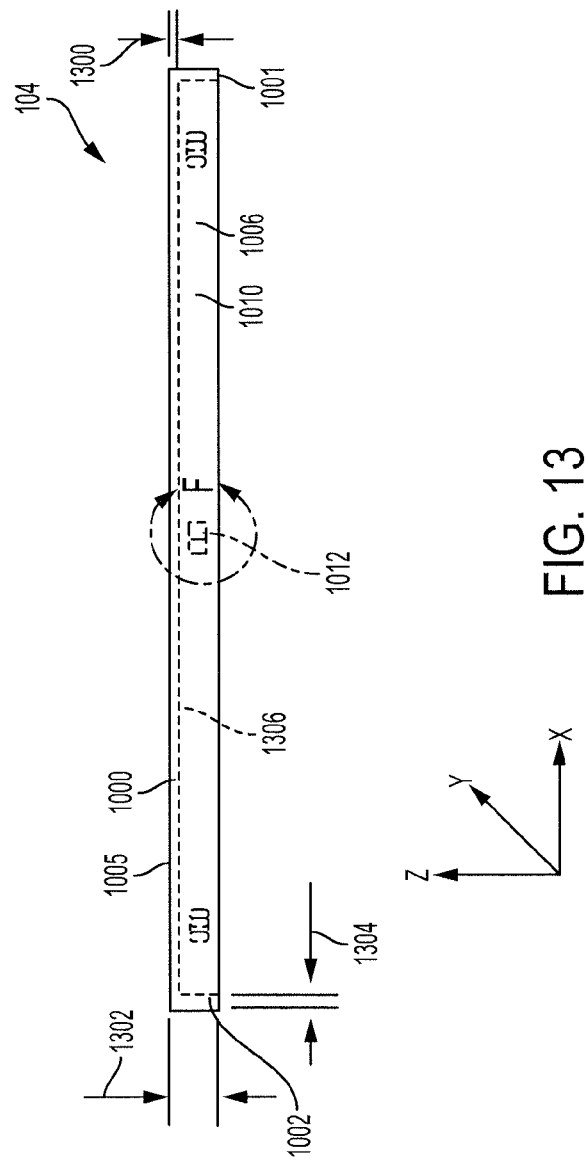
FIG. 13 is a side view of the top piece of FIG. 10 according to an embodiment of the invention.

With reference now to FIG. 13, the tab 1012 may not contact a lower surface 1306 of the horizontal component 1000 and may be positioned above a plane defined by the bottom 1001 of the top piece 104.

The horizontal component 1000 may have a distance 1300 extending from the top 1005 to the bottom 1001 of the top piece 104. In some embodiments, the distance 1300 may be 2 millimeters. The vertical component 1002 may have a distance 1302 extending from the top 1005 to the bottom 1001. In some embodiments, the distance 1302 may be 10.5 millimeters. The vertical component 1002 may have a thickness 1304 radially out from a center of the top piece 104. In some embodiments, the thickness 1304 may be 3 millimeters.

Figure 14:
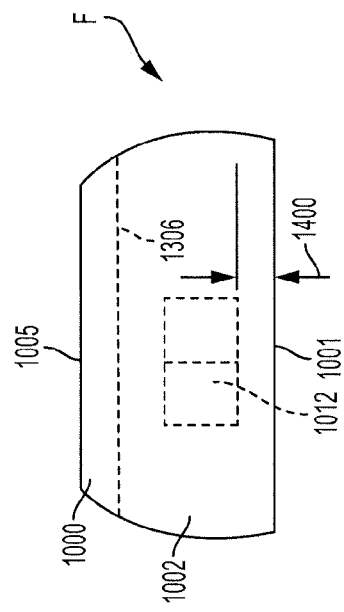
FIG. 14 is an enlarged side view of a portion of the top piece of FIG. 10 according to an embodiment of the invention.

With reference to FIG. 14, the tab 1012 may be positioned a distance 1400 from the bottom 1001 towards the top 1005. In some embodiments, the distance 1400 may be 2 millimeters.

Figure 15:
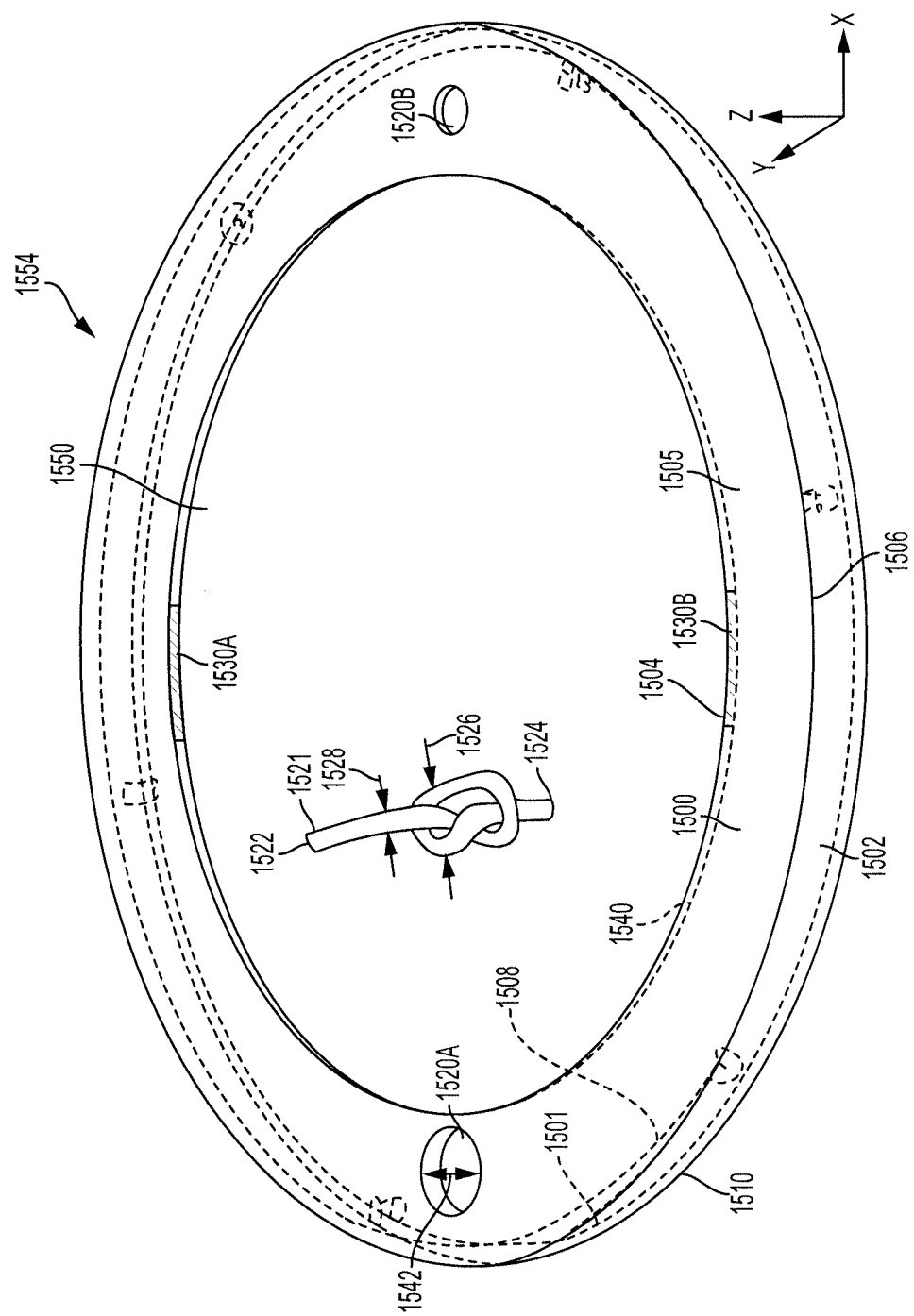
FIG. 15 illustrates a top piece and a handle for moving the top piece according to an embodiment of the invention.

With reference now to FIG. 15, another top piece 1554 includes a horizontal component 1500 that defines a first opening 1520A and a second opening 1520B in the Z direction. One or more handles such as a handle 1521 may be provided for use with the top piece 1554. The handle 1521 may have a top end 1522 and a bottom end 1524. A portion of the handle 1521 near the top end 1522 may have a thickness 1528. A portion of the handle 1521 nearer the bottom end 1524 than the top end 1522 may have a thickness 1526.

In some embodiments, the handle 1521 may include a natural material, a plastic and/or a composite material in a solid, rope or other form. For example, the handle 1521 may include polypropylene. In order to couple the handle 1521 to the top piece 1554, the top end 1522 of the handle 1521 may be inserted through the first opening 1520A from the bottom 1501 towards the top 1505. The top end 1522 may be grasped and pulled upward to remove a basket from a basket cavity.

The first opening 1520A may have a diameter 1542. In some embodiments, the diameter 1542 may be greater than the thickness 1526 of the handle 1521 near the bottom 1524. Accordingly, when the portion of the handle 1521 having the thickness 1526 contacts the portion of the top piece 1554 defining the first opening 1520A, the handle 1521 resists upward motion relative to the top piece 1554. Accordingly, the top piece 1554 may be moved upwards by applying an upward force on the handle 1521.

The inner horizontal surface 1504 of the top piece 1554 may define, include and/or be connected to a connector 1530A and a connector 1530B. The connector 1530A and the connector 1530B may include any type of connector including but not limited to the snap connectors illustrated in FIGS. 19A-A-19C, a spring clip, a button, a dowel, screw threading or the like. In some embodiments, the connector 1530A and the connector 1530B may comprise one connector, such as screw threading, that is positioned about the circumference of the inner horizontal surface 1504.

A pool vacuum hose may have a connector capable of connecting to the connector 1530A and the connector 1530B. In that regard and with reference to FIGS. 1 and 15, a first end of the pool vacuum hose may be positioned in the pool and may receive water. Another end of the pool vacuum may be coupled to the connector 1530A and the connector 1530B. As the water flows from the first end to the second end of the pool vacuum hose, the water is drawn through the adaptable basket 100 where the net apparatus 102 collects debris.

Figure 16:
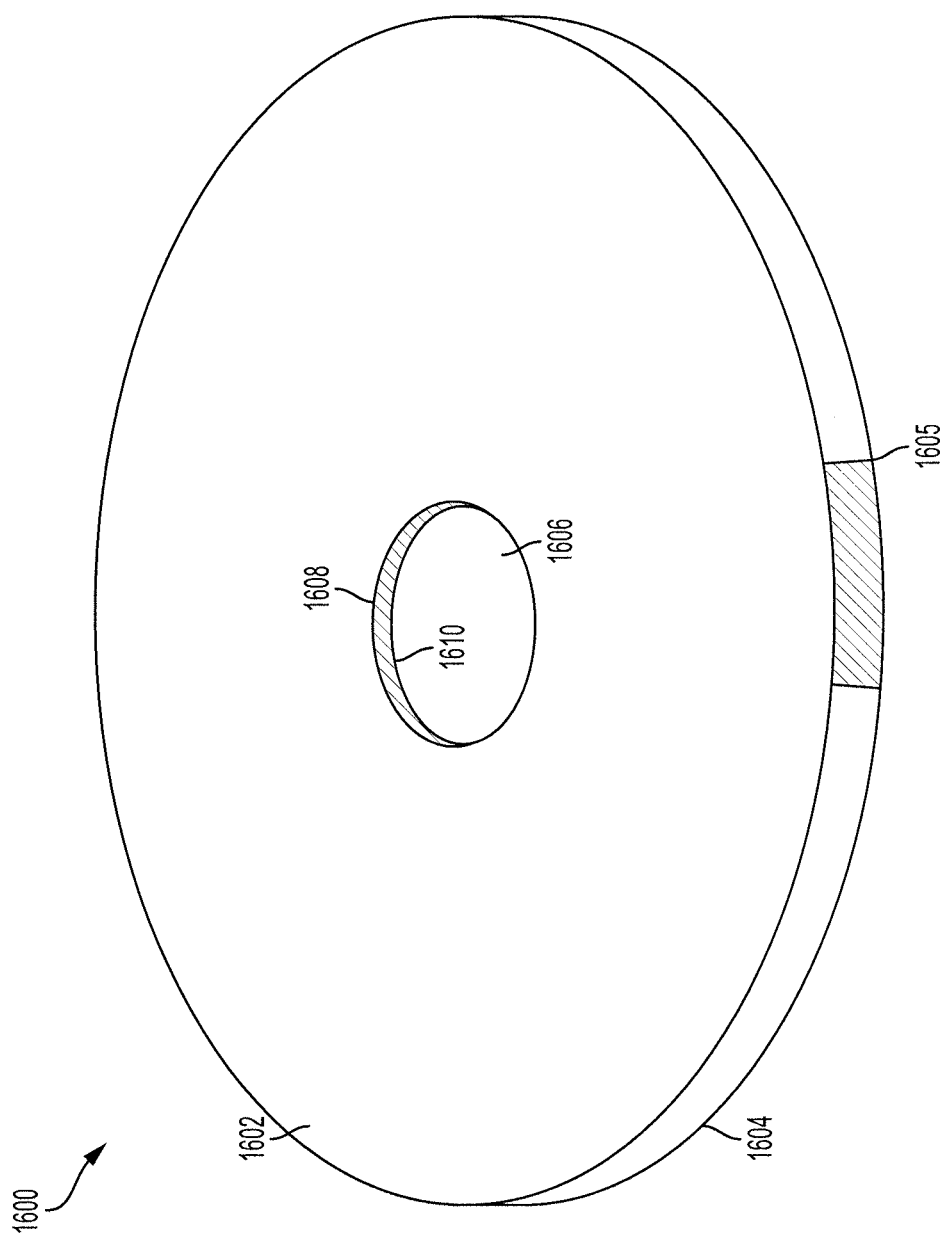
FIG. 16 illustrates a pool vacuum attachment capable of being coupled to the top piece of FIG. 15 according to an embodiment of the invention.

With reference now to FIGS. 15 and 16, a pool vacuum attachment 1600 may be provided. The pool vacuum attachment 1600 may include a connector 1605. The connector 1605 may be capable of being coupled to the connector 1530A and/or the connector 1530B of the top piece 1554. In that regard, the pool vacuum attachment 1600 may be positioned in and substantially fill an opening 1550 defined by the inner horizontal surface 1504.

The pool vacuum attachment 1600 may also define a hole 1606. An inner surface 1610 of the hole 1606 may define, include or be coupled to a connector 1608. The connector 1608 may be capable of being coupled to a pool vacuum hose such that the hole 1606 may receive fluid from the pool vacuum hose.

With reference now to FIGS. 1-16, the adaptable basket 100 provides advantages over traditional baskets. For example, the net apparatus 102 provides benefits and advantages such as greater flow-through than traditional baskets because of the use of netting instead of a formed rigid material. Similarly, the adaptable basket 100 may provide improved filtration for a variety of debris sizes over traditional baskets because many nettings can be provided having various sized openings. This provides additional advantages of allowing the net apparatus 102 to be changed based on a type or size of debris and allowing the net apparatus 102 to be replaced when damaged without paying for an entirely new basket.

The adaptability of the adaptable basket 100 also provides several benefits and advantages over traditional baskets. For example, because the net apparatus 102, the top piece 104 and the bottom piece 106 are each separable, the adaptable basket 100 is easily repairable because any single component can be replaced without purchase of a new basket. Similarly, because of the collapsibility of the net apparatus 102, the adaptable basket 100 can be stored or shipped in a compact fashion, reducing storage space and shipping costs. Because pieces of various sizes can be provided, an adaptable basket 100 can be designed for any size pool skimmer, and because each component can be manufactured separately, the cost of manufacture of the adaptable basket 100 may be less than that of traditional pool baskets.

The adaptable basket 100 is also advantageous as it may be capable of being coupled to and receiving fluid from a pool vacuum hose or a pool vacuum attachment. Additionally, one or more components may not include plastic, rendering the adaptable basket 100 eco-friendly.

Figure 17:
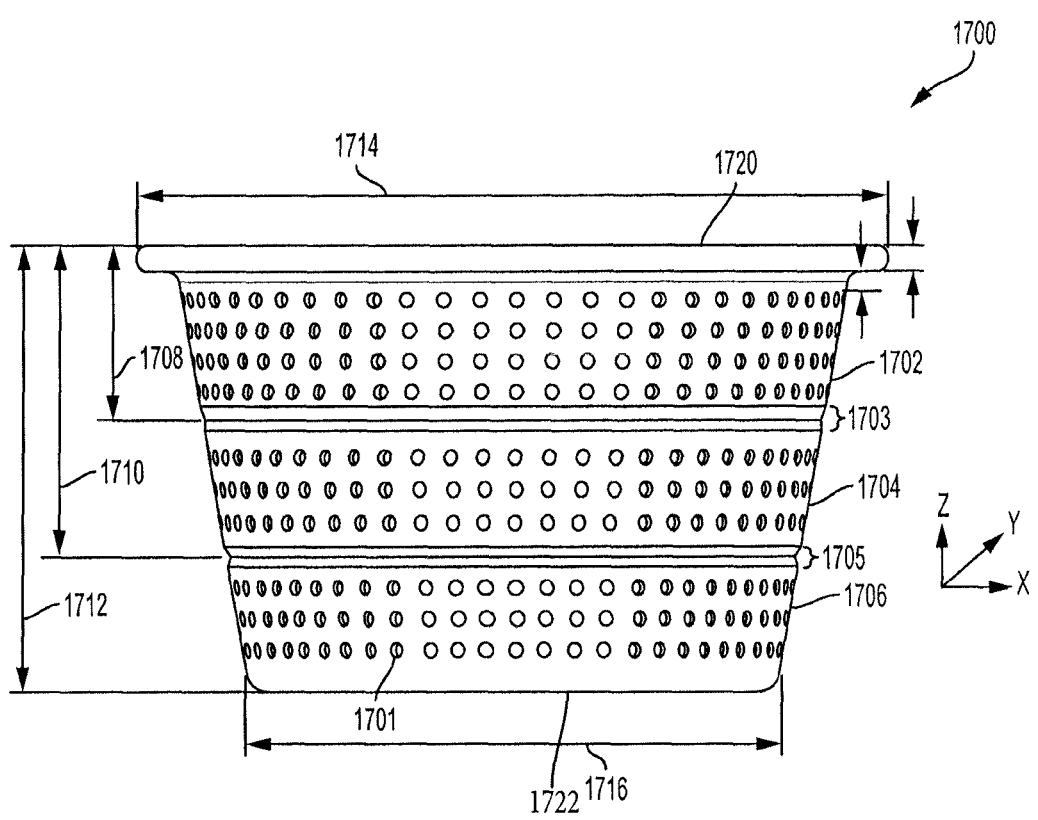
FIG. 17 illustrates a collapsible adaptable basket according to an embodiment of the invention.
Figure 18:
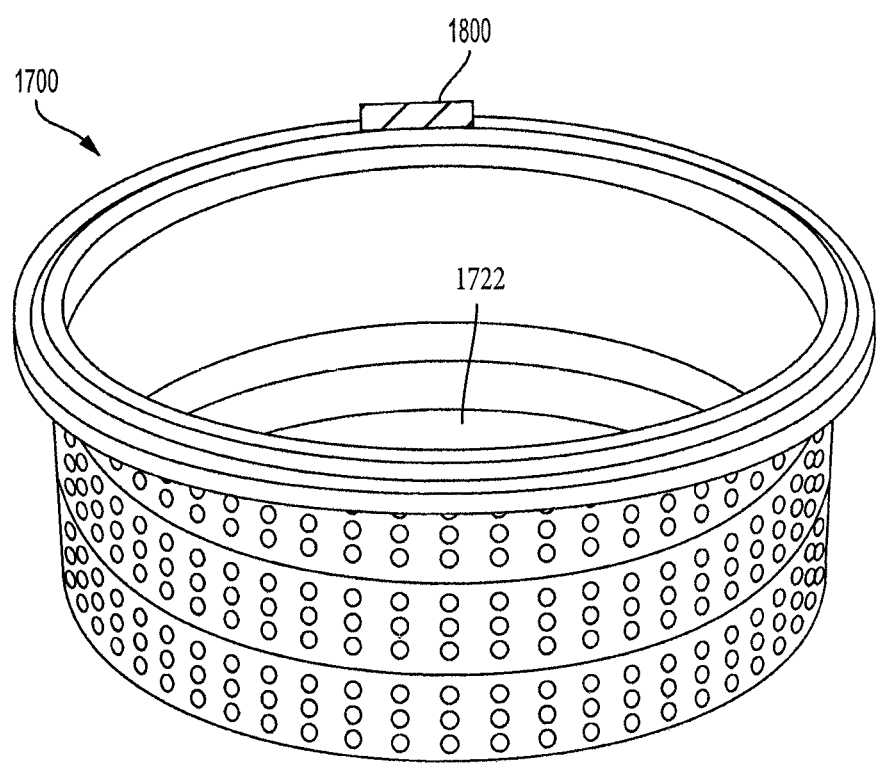
FIG. 18 illustrates the adaptable basket of FIG. 17 in a collapsed state according to an embodiment of the invention.

With reference now to FIGS. 17 and 18, another adaptable basket 1700 includes a top rigid portion 1702, a middle rigid portion 1704 and a bottom rigid portion 1706. In some embodiments, the adaptable basket 1700 may include any number of rigid portions. The adaptable basket 1700 may also include a first flexible portion 1703 and a second flexible portion 1705. The first flexible portion 1703 may be positioned between the top rigid portion 1702 and the middle rigid portion 1704 (i.e., coupled to a bottom of the top rigid portion 1702 and a top of the middle rigid portion 1704) and the second flexible portion 1705 may be positioned between the middle rigid portion 1704 and the bottom rigid portion 1706. The adaptable basket 1700 may also include a bottom portion 1722 coupled to the bottom circumference of the bottom rigid portion 1706 and extending radially inward, filling the plane defined within the bottom circumference of the bottom rigid portion 1706.

Each of the rigid portions 1702, 1704, 1706 of the adaptable basket 1700 may define a plurality of holes including a hole 1701. Accordingly, fluid may flow through the holes while the structure of the adaptable basket 1700 will prevent debris of a certain size from flowing through the adaptable basket 1700. In some embodiments, some, none, or all of the flexible portions 1703, 1705 and/or the bottom portion 1722 may define holes.

The top rigid portion 1702 may have a diameter 1714. The bottom rigid portion 1706 may have a diameter 1716 that is less than the diameter 1714. In some embodiments, the diameter 1714 may be 210 millimeters and the diameter 1716 may be 148.96 millimeters. The middle rigid portion 1704 may have a diameter that is between the diameter 1714 and the diameter 1716. As shown in FIG. 17, each of the rigid portions 1702, 1704, 1706 of the adaptable basket 1700 have a diameter that tapers towards the negative Z direction; however, in some embodiments, some or all of the rigid portions may not taper or may taper towards the positive Z direction.

The top rigid portion 1702, the middle rigid portion 1704 and the bottom rigid portion 1706 may comprise a metal, a plastic, another composite material or the like. The first flexible portion 1703 and the second flexible portion 1705 may comprise a flexible material such as a rubber.

The first flexible portion 1703 is capable of changing shape along the Z axis, thus allowing the top rigid portion 1702 to move relative to the middle rigid portion 1704 in the Z direction. This movement may occur when a predetermined amount of force is applied to the top rigid portion 1702 in the negative Z direction and/or is applied to the middle rigid portion 1704 in the positive Z direction. When sufficient force is exerted on the top rigid portion 1702 or the middle rigid portion 1704, the top rigid portion 1702 can move relative to the middle rigid portion 1704 in the Z direction. As such, the top rigid portion 1702 may be positioned at substantially the same location along the Z axis as the middle rigid portion 1704 such that the middle rigid portion 1704 is surrounded by the top rigid portion 1702. Similarly, the second flexible portion 1705 allows the middle rigid portion 1704 to move along the Z axis with respect to the bottom rigid portion 1706. Accordingly, the middle rigid portion 1704 may be positioned at substantially the same locations along the Z axis as the bottom rigid portion 1706 and may surround the bottom rigid portion 1706.

When the top rigid portion 1702, the middle rigid portion 1704 and the bottom rigid portion 1706 are positioned at substantially the same locations along the Z axis, the adaptable basket 1700 is in a collapsed state. The top rigid portion 1702 has a height 1708 in the Z direction. The middle rigid portion 1704 has a distance 1710 from a top 1720 of the adaptable basket 1700. Similarly, the bottom rigid portion 1706 has a distance 1712 from the top 1720. Accordingly, each of the portions has a distance in the Z direction. When the adaptable basket 1700 is collapsed, the distance of the entire adaptable basket 1700 in the Z direction will be substantially the same as the distance of the largest portion in the Z direction. Typically, each of the rigid portions 1702, 1704, 1706 has approximately the same height.

With reference now to FIG. 18, the adaptable basket 1700 may define or include a connector 1800. The connector 1800 may be any connector including, but not limited to, one of the snap connectors illustrated in FIGS. 19A-A-19C, a spring clip, a button, a dowel, screw threading or the like. The connector 1800 may be capable of being coupled to a connector of a pool vacuum hose such that the adaptable basket 1700 can be coupled to the adaptable basket hose and filter debris from a flow of the pool vacuum. With reference now to FIGS. 16 and 18, the connector 1800 may be capable of being connected to the connector 1605 of the pool vacuum attachment 1600.

The adaptable basket 1700 similar benefits and advantages as described above with respect to the adaptable basket 100.

With reference to FIGS. 19A-A-19A-H, a variety of snap connectors are illustrated. The snap connectors shown in FIGS. 19A-A-19A-H are exemplary only and not meant to limit any aspects of the disclosure to the specifically shown snap connectors.

Figure 19B:
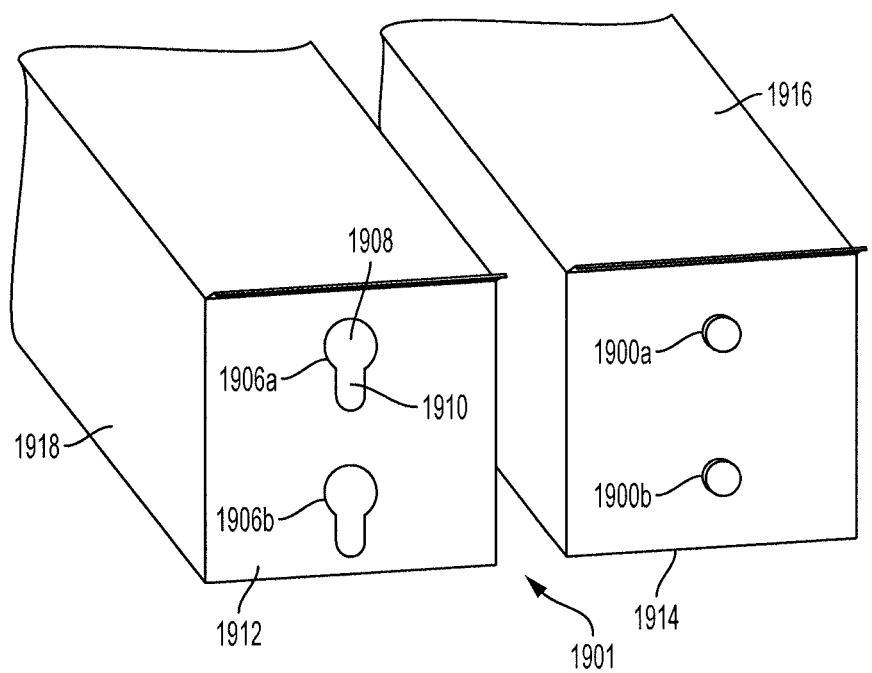
FIGS. 19A-A-19C illustrate different designs of snap connectors according to various embodiments of the invention.
Figure 19C:
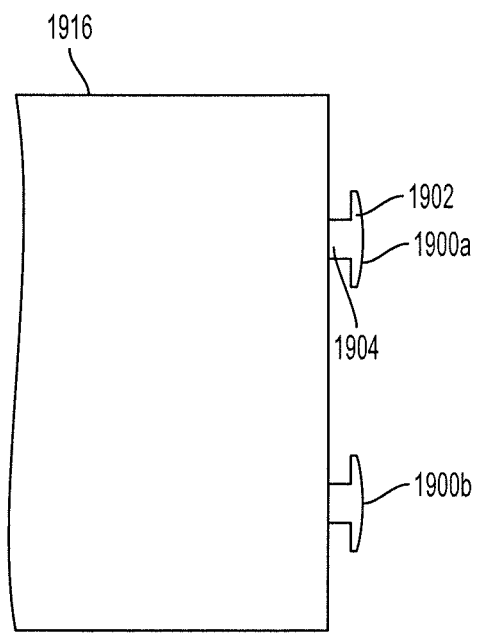

FIGS. 19B and 19C illustrate an exemplary snap connector 1901 that can be used as a connector between a first piece 1916 and a second piece 1918. The snap connector 1901 can be used as any connector or connectors of any of the pieces disclosed herein. The snap connector 1901 includes a female portion 1912 and a male portion 1914.

The female portion 1912 defines a plurality of slots 1906 including a slot 1906a and a slot 1906b. The slots may have at least a larger diameter portion 1908 and a smaller diameter portion 1910. The second piece 1918 can include a plurality of protrusions 1900 including a protrusion 1900a and a protrusion 1900b. The protrusions 1900 can include a head 1902 and a neck 1904 having a smaller diameter than the head 1902.

In order to couple the first piece 1916 to the second piece 1918, the head 1902 may be inserted through the larger diameter portion 1908 of the corresponding slot 1906. When the head 1902 has extended past the corresponding slot 1906, the neck 1904 may be aligned with the slot 1906. At this point, the neck 1904 may be moved towards the smaller diameter portion 1910. As the head 1902 has a larger diameter than the smaller diameter portion 1910, the first piece 1916 is then coupled to the second piece 1918.

Figure 20A:
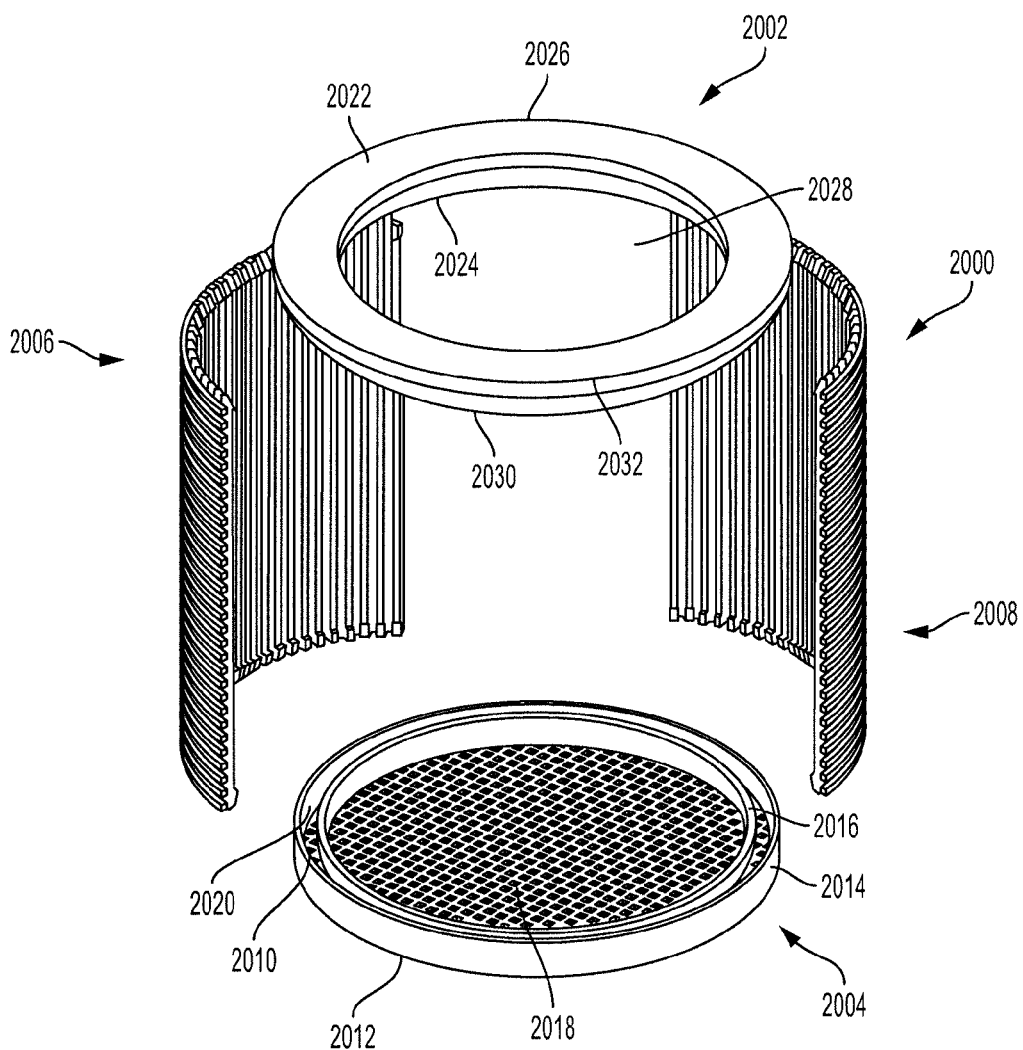
FIG. 20A is an exploded view of an adaptable basket according to an embodiment of the invention.

With reference to FIG. 20A, another adaptable basket 2000 includes a top piece 2002, a bottom piece 2004, a first side piece 2006 and a second side piece 2008. The adaptable basket 2000 may include any number of side pieces and, in preferred embodiments, the adaptable basket 2000 includes 2, 3 or 4 side pieces. Any discussion regarding any side piece can be equally applicable to any other side piece.

Some basket cavities are adapted to receive baskets having a cube, rectangular prism, triangular prism shape. In order to accommodate the various sizes and shapes of the cavities, baskets can be provided having top pieces, bottom pieces, and/or side pieces of various shapes and sizes.

The bottom piece 2004 may be constructed from any material, such as metal, plastic, wood, hard rubber or the like. The bottom piece 2004 has a top 2010, a bottom 2012 and a circumference 2014. The circumference 2014 can be circular, square, rectangular, triangular or the like and can define an opening 2016. In some embodiments, the opening 2016 can be replaced by a mesh 2018 of metal, plastic, hard rubber, soft netting or the like. In some embodiments, the opening 2016 may be replaced by solid material.

Figure 22:
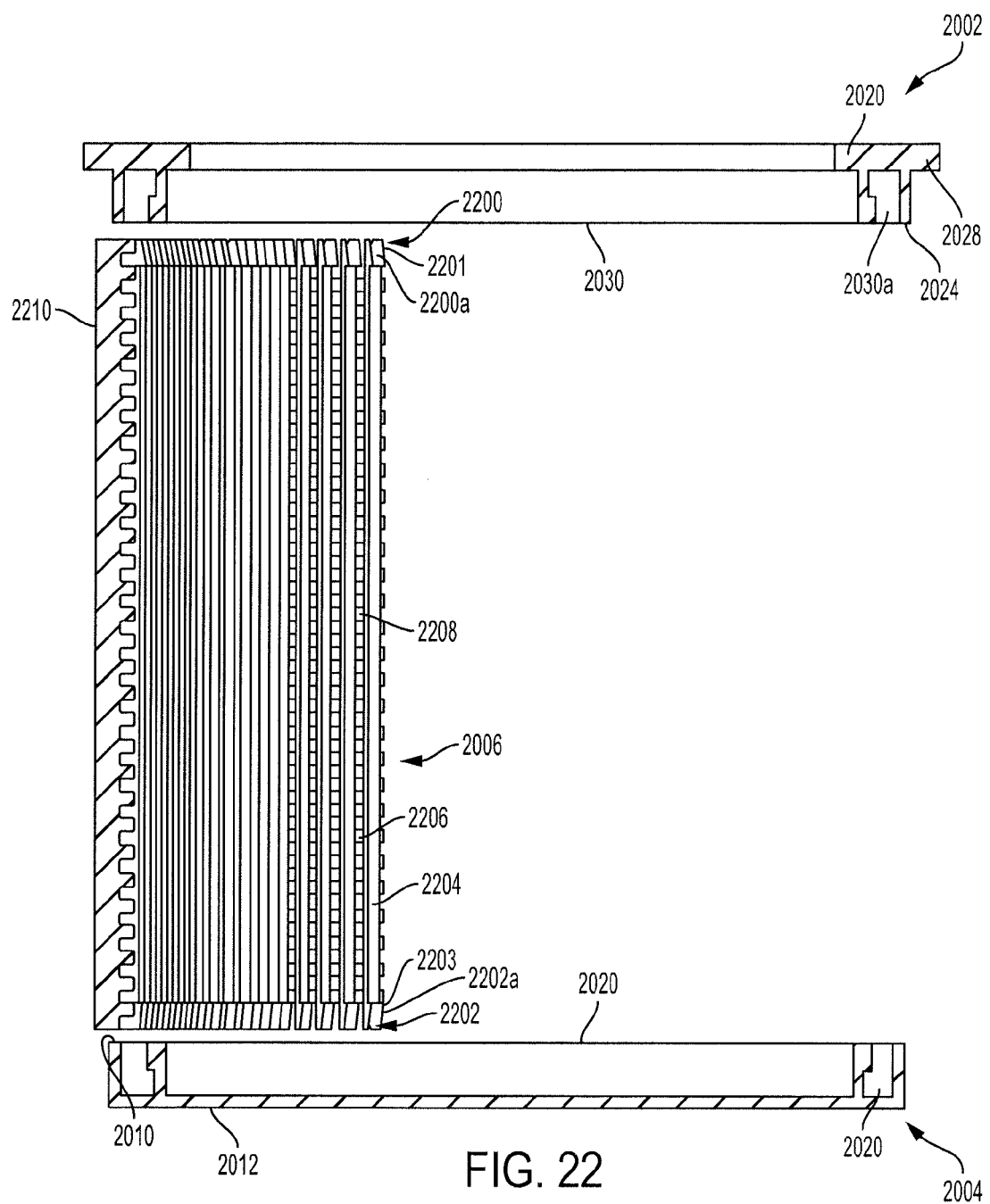
FIG. 22 illustrates an exploded side view of the side piece, the bottom piece and a top piece of the adaptable basket of FIG. 20A according to an embodiment of the invention.

The bottom piece 2004 also includes a connector 2020. The connector 2020 is to be positioned substantially at the circumference 2014 of the bottom piece 2004. The connector 2020 may include any material such as, for example, metal, plastic, rubber, wood or the like. In some embodiments, the bottom piece 2004 has a finite number of connectors 2020a, as illustrated in FIG. 22. In some embodiments, the bottom piece 2004 includes the connector 2020 extending about the entire circumference 2014 of the bottom piece 2004.

Figure 20B:
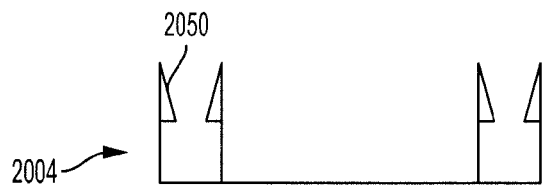
FIG. 20B illustrates a connector of a bottom piece of the adaptable basket of FIG. 20A for connecting the bottom piece to a side piece of the adaptable basket of FIG. 20A according to an embodiment of the invention.

With reference now to FIGS. 20A and 20B, the connector 2020 may be a snap connector, including but not limited to those illustrated in FIGS. 19A-A-19-C, a spring clip, a button, a dowel, screw threading or the like. The connector 2020 may include a cavity or opening (i.e., a female mating piece) for receiving another connector (such as a male mating piece). For example, the connector 2020 can include one more beveled edge 2050 within the opening of the connector 2020. The beveled edge 2050 can taper towards an opening of the cavity such that the connector 2020 can be coupled to another connector having a beveled edge (for example, the bevels shown as connectors 2202 of the first side piece 2006). In some embodiments, the bottom piece may include a male connector and the side pieces may include a female connector.

In some embodiments, the connector 2020 may define a plurality of holes (not shown) positioned radially outward from a center of the bottom piece 2004 and adapted to receive a pin (not shown). The side pieces 2006, 2008 may also define holes (not shown) configured to align with the holes of the connector 2020. When aligned, a pin may be inserted through the holes of the connector 2020 and the holes of the side pieces 2006, 2008, coupling the side pieces 2006, 2008 to the bottom piece 2004. In some embodiments, the pins may be the only method of coupling and, in some embodiments, the pins may provide reinforcement for another method of coupling.

Figure 21:
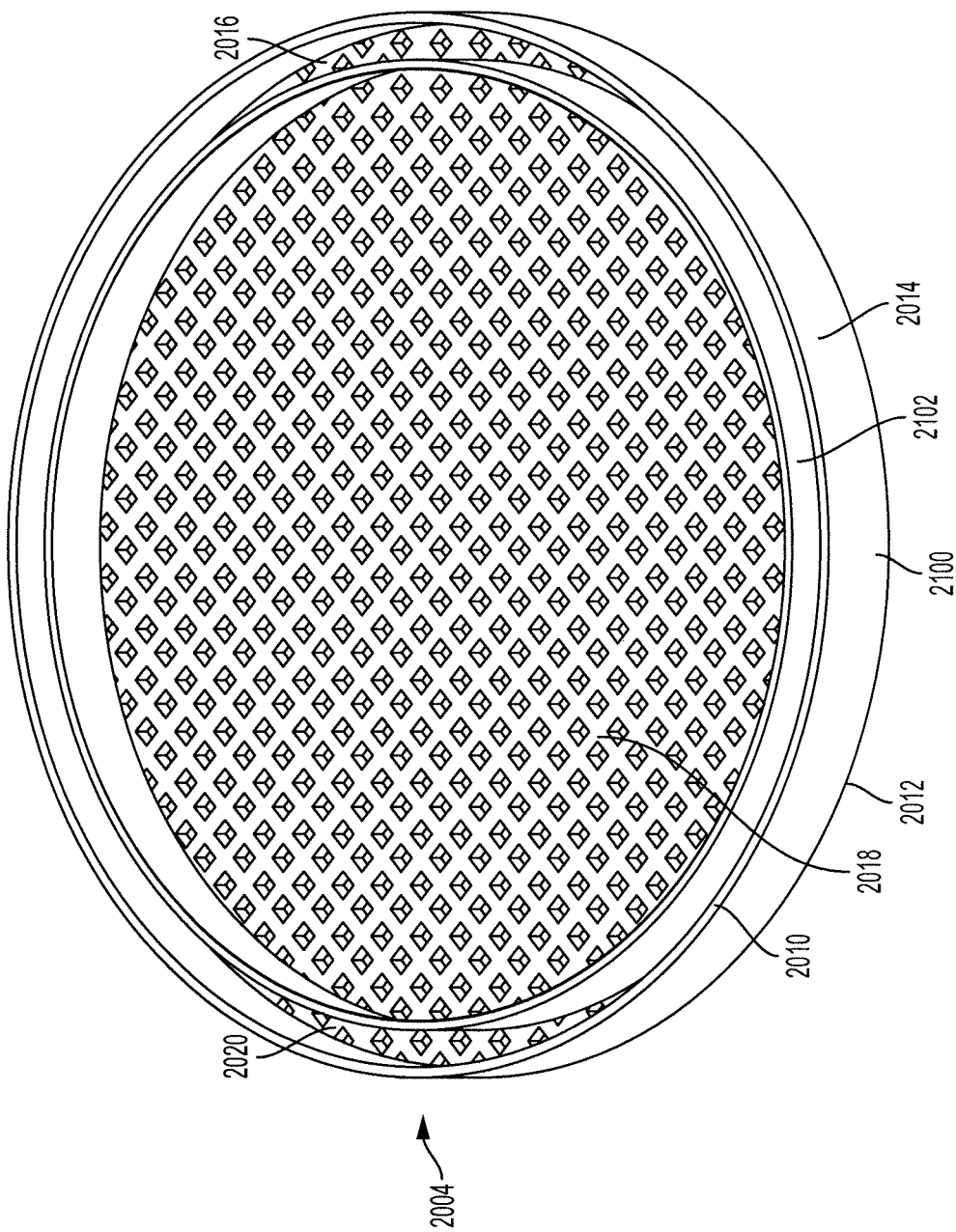
FIG. 21 illustrates an enlarged view of the bottom piece of FIG. 20A according to an embodiment of the invention.

FIG. 21 illustrates an enlarged view of the bottom piece 2004. As illustrated, the connector 2020 can include define a first extension 2100 of material extending upwards from the bottom 2012 of the bottom piece 2004 to the top 2010 of the bottom piece 2004. The first extension 2100 can be substantially aligned with the circumference 2014 of the bottom piece 2004, or it can be slightly radially outward or radially inward from the circumference 2014. The connector 2020 also includes a second extension 2102 of material extending upwards from the bottom 2012 of the bottom piece 2004 to the top 2010 of the bottom piece 2004. The second extension 2102 is positioned radially inward from the first extension 2100. In some embodiments (such as that shown in FIG. 20B), the first extension 2100 and/or the second extension 2102 can define the beveled edge. In some embodiments, the connector 2020 includes another type of connector (such as screw threading) and may not include one or both of the first extension 2100 or the second extension 2102.

As with the other baskets described herein, the pieces of the adaptable basket 2000 are adaptable such that they can be easily separated. This allows baskets to be provided having various sizes as well as pieces having mesh material defining openings of various sizes. Additionally, pieces of the adaptable basket 2000 can be easily replaced by removing a broken piece and replacing it with a new piece.

Returning to FIG. 20A, the top piece 2002 may include any material, such as metal, plastic, wood, hard rubber or the like and the material of the top piece 2002 may be different than the material of the bottom piece 2004. The top piece 2002 has a top 2022, a bottom 2024 and a circumference 2026. The circumference 2026 can be circular, square, rectangular, triangular or the like. The circumference 2026 can define an opening 2028. In most embodiments, the opening 2028 is not covered so that water from the pool, including debris, can enter the adaptable basket 2000 through the opening 2028.

The top piece 2002 may also include a lip 2032. The lip 2032 may extend away from the top piece 2002 and be received by a basket cavity, reducing the likelihood of the adaptable basket 2000 moving relative to the basket cavity. In some embodiments, the adaptable basket 2000 is held in place in the basket cavity due to friction between the adaptable basket 2000 and the cavity. In some embodiments, the weight of the adaptable basket 2000 may cause the bottom piece 2004 to rest on a bottom of the skimmer cavity (for example, the bottom piece 2004 may include a stud for contacting the bottom of the skimmer cavity).

The top piece 2002 also includes a connector 2030. The connector 2030 may be positioned near the circumference 2026 of the top piece 2002. The connector 2030 may be any material. For example, the connector 2030 may be metal, plastic, rubber or the like. In some embodiments, the top piece 2002 has a finite number of connectors 2030a, such as those illustrated in FIG. 22. In some embodiments, the top piece 2002 has one large connector that extends across the circumference 2026 of the top piece 2002, as illustrated in FIG. 20A.

The connector 2030 may include any type of connection such as, but not limited to, a snap connector such as those illustrated in FIGS. 19A-A-19C, a spring clip, a button, a dowel, screw threading or the like. As shown, the connector 2030 is female such that it defines an opening for receiving a male connector. The connector 2030 can include one or two beveled edges within the opening of the connector 2030.

As with the connector 2020, the connector 2030 can include a first extension of material and a second extension of material extending downwards from the top 2026 of the top piece 2002 to the bottom 2024 of the top piece 2002. The second extension may be positioned radially inward from the first extension. In some embodiments, the connector 2030 only includes one extension or does not include any extensions.

The side pieces 2006, 2008 can include any material, such as plastic, rubber, metal, netting and/or the like. At least part of the side pieces 2006, 2008 include or define a mesh. For example, the side pieces 2006, 2008 can include a structured perimeter and a mesh defined within the perimeter. In some embodiments, the side pieces 2006, 2008 can be formed from a variety of materials, such that a first material is used as a perimeter and a second material, such as netting, is coupled to and used within the perimeter.

With reference to FIG. 22, the first side piece 2006 includes vertical bars 2204 and horizontal bars 2206 coupled together to form a mesh defining openings 2208. In some embodiments, the first side piece 2006 is constructed from a solid piece of material and openings are formed through the solid material, in some embodiments the mesh is cast and in some embodiments, the vertical bars 2204 and the horizontal bars 2206 are formed separately and coupled together.

The first side piece 2006 may have any shape. In some embodiments, it may extend directly from the circumference 2014 of the bottom piece 2004 to the circumference 2026 of the top piece 2002. In other embodiments, the first side piece 2006 may include additional shapes, such as an outward or inward curve, bend, or slant between the bottom piece 2004 and the top piece 2002.

In some embodiments of the basket, the circumference 2026 of the top piece 2002 may be larger or smaller than the circumference 2014 of the bottom piece 2004. In these embodiments, the first side piece 2006 may be angled, slanted, or curved.

The first side piece 2006 may include a first connector 2200 adapted to attach to the connector 2030 and the second connector 2202 adapted to attach to the connector 2020. The connectors 2200, 2202 may be any type of connector, such as, but not limited to, a snap connector such as those illustrated in FIGS. 19A-A-19C, a spring clip, a button, a dowel, screw threading or the like. The connectors 2200, 2202 can be the same or different types.

As shown in FIG. 22, the first connector 2200 includes a plurality of connectors 2200a positioned at a top of each of the vertical bars 2204 and the second connector 2202 includes a plurality of connectors 2202a positioned at a bottom of each of the vertical bars 2204. In some embodiments, the first connector 2200 and/or the second connector 2202 may include a single connector extending along a bottom/top edge of the corresponding piece.

As shown in FIG. 22, the connectors 2200a each include a beveled edge 2201. The top piece 2002 may include a plurality of connectors 2030a consisting of an opening and a beveled edge (not shown) adapted to attach to each of the connectors 2200a. Likewise, the connectors 2202a each include a beveled edge 2203. In some embodiments, the connectors 2030, 2020 include a single connector extending the circumferences 2014, 2026 of the bottom piece 2004 and the top piece 2002. For example, the connector 2020 defines an opening extending the circumference 2014 of the bottom piece and adapted to receive each of the connectors 2200a. Since the connector 2020 is a single opening, each of the connectors 2202a may be positioned anywhere within the opening and still attach the first side piece 2006 to the bottom piece 2004. The connector 2030 may be function in a similar manner as the connector 2020.

In some embodiments, the ends 2210 of the first side piece 2006 are adapted to attach together. For example, one end of the first side piece 2006 may include a connector (not shown) that is adapted to attach to a connector (not shown) on an end of the second side piece 2008. In some embodiments, the horizontal bars 2206 define and/or are coupled to connectors on their ends.

In some embodiments, the first connector 2200, the second connector 2202, the connector 2020 and/or the connector 2030 may be adapted to attach at an angle. This is to allow connections if the basket is tapered.

Figure 23A:
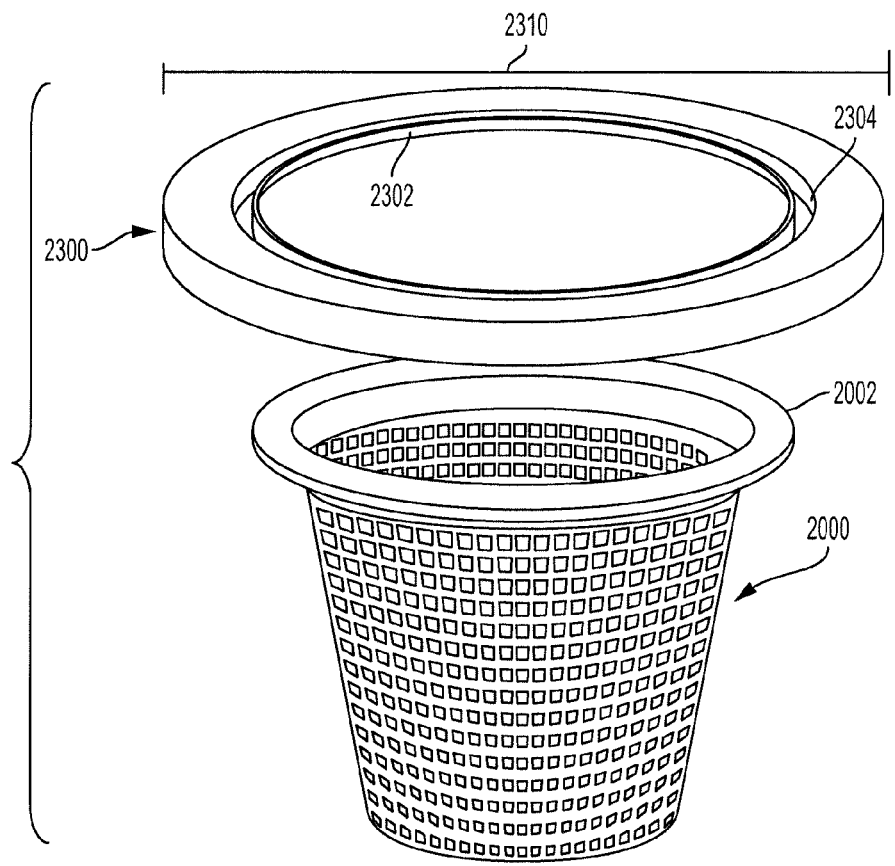
FIG. 23A illustrates an adapter for allowing an adaptable basket to be used in place of a larger basket according to an embodiment of the invention.

FIG. 23A illustrates an adapter 2300 for the adaptable basket 2000. The adapter 2300 may include a connector 2302 and a lip 2304 extending radially outward from the connector 2302. In some embodiments, the adapter 2300 may include several pieces and several connectors adapted to attach the pieces together. The connector 2302 can include one or more of a snap connector such as those illustrated in FIGS. 19A-A-19C, a spring clip, a button, a dowel, screw threading or the like.

Various sizes of adapters can be provided that each allow a basket having a certain size to be used as a basket of a larger size. For example, the adapter 2300 may have a diameter of 7.25 inches and used to convert a basket having a 6.5 inch diameter top piece into a basket having a 7.25 inch diameter top piece.

In some embodiments, the connector 2302 has the same diameter and/or circumference as the top piece 2002 of the adaptable basket 2000. The connector 2302 may include, for example, one or more of a snap connector such as those illustrated in FIGS. 19A-A-19C, a spring clip, a button, a dowel, screw threading or the like.

In some embodiments, the connector 2302 may include a lock and key type rotating connector. The connector 2302 may be aligned with the top piece 2002 such that the connector 2302 and the top piece 2002 are touching, then the adapter 2300 may be rotated, causing the connector 2302 to attach to the top piece 2002.

Figure 23B:
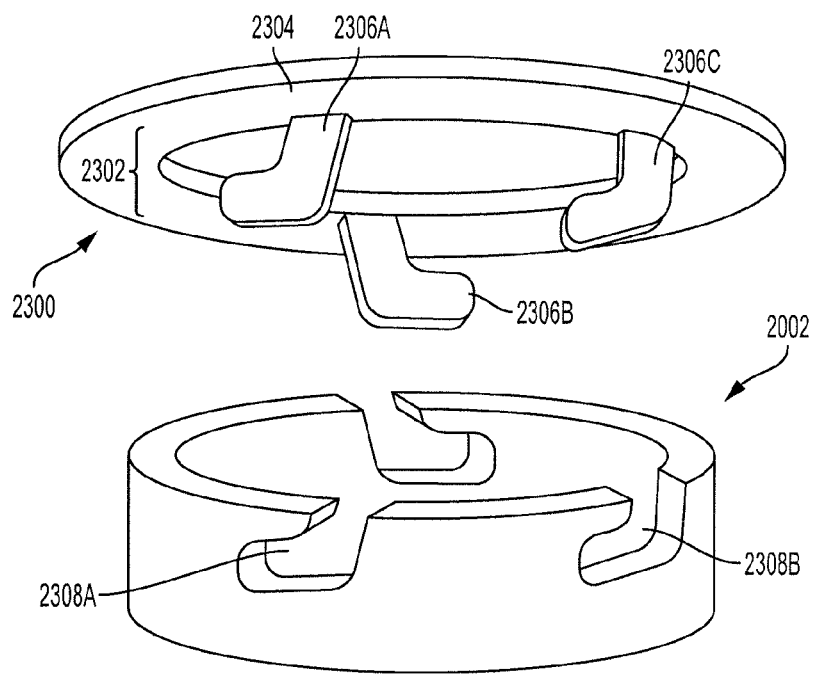
FIG. 23B illustrates how the adapter of FIG. 23A may attach to the adaptable basket of FIG. 20A according to an embodiment of the invention

FIG. 23B illustrates an embodiment of the connector 2302 including latches 2306a, 2306b and 2306c on the inside of the adapter 2300. Openings 2308 are defined by the top piece 2002 such that the latches 2306 can fit within the openings 2308. When the latches 2306 are within the openings 2308 and the adapter 2300 is rotated in a first direction, the latches 2306 may become locked within the openings 2308, reducing the tendency of the adapter 2300 to separate from the top piece 2002. To unlock the adapter 2300, the adapter 2300 may be rotated in a direction opposite from the first direction.

Returning to FIG. 23A, the lip 2304 may have a diameter 2310 that is the same as the diameter of the larger sized basket. In this way, lip 2304 can be received by a cavity that typically receives a basket having an upper diameter that is substantially the same as the diameter 2310, even though the adaptable basket 2000 is designed to be used in a smaller basket.

In some embodiments, the adapter 2300 may be modular. For example, the adapter 2300 may include separate pieces that are adapted to attach to each other. Additionally or instead, the adapter 2300 may include various pieces and hinges between the pieces so that the pieces can fold over each other. The adapter 2300 may also or instead be adaptable in another method, such as inclusion of snap connectors between pieces. This allows the size of the adapter 2300 to decrease for storage or shipping.

Figure 24:
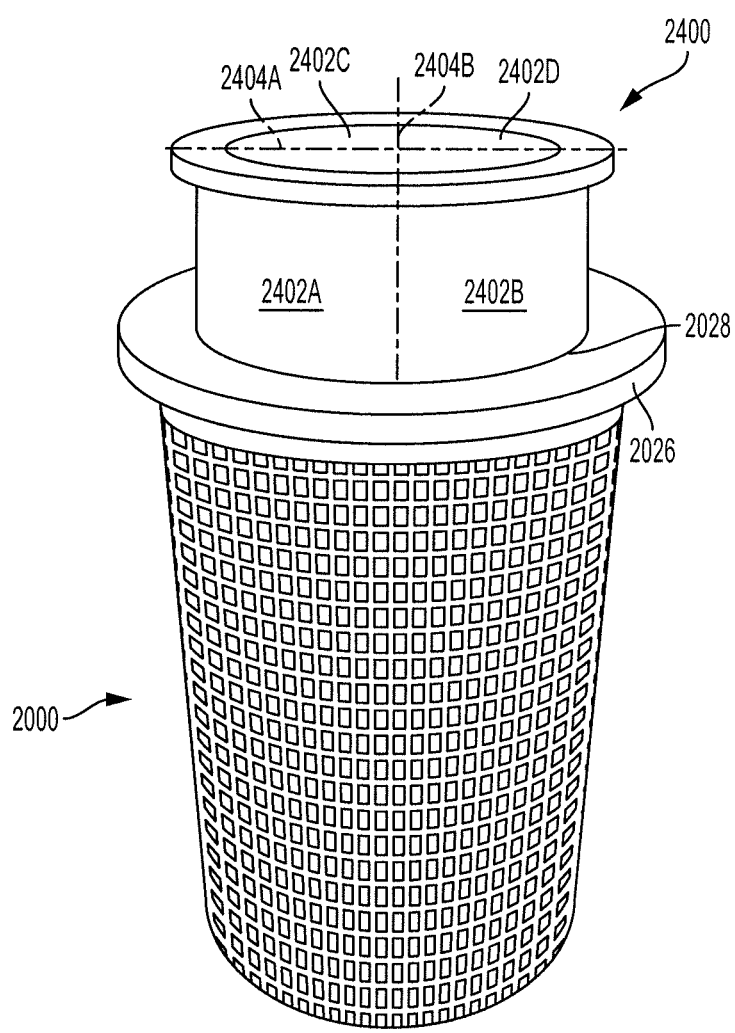
FIG. 24 illustrates a weir to be used with the adaptable basket of FIG. 20A according to an embodiment of the invention.

FIG. 24 illustrates the adaptable basket 2000 and a weir 2400. The weir 2400 may rest within the opening 2028 of the adaptable basket 2000 such that relatively little space exists between the weir and the circumference 2026 of the top piece 2002. The weir 2400 may control the flow of water into the opening 2028 of the basket. The weir 2400 may be made from any material, such as plastic, hard rubber, soft rubber, metal, foam or the like.

As with the adaptable basket 2000, the weir 2400 may also be collapsible. For example, the weir 2400 may include any number of separate pieces 2402 coupled together. In FIG. 24, the weir 2400 includes 4 pieces 2402a, 2402b, 2402c and 2402d. The pieces 2402 may be coupled together in a variety of manners, such as a hinge or other connector between the pieces 2402. In some embodiments, one or more rods 2404 can be positioned between the pieces 2402 such that the pieces 2402 are held in place by tension created by the rods 2404. The pieces 2402 may also or instead be coupled together in other manners.

The adaptable basket 2000 provides the same benefits and advantages as discussed above with respect to the adaptable basket 100 of FIG. 1.

Figure 25:
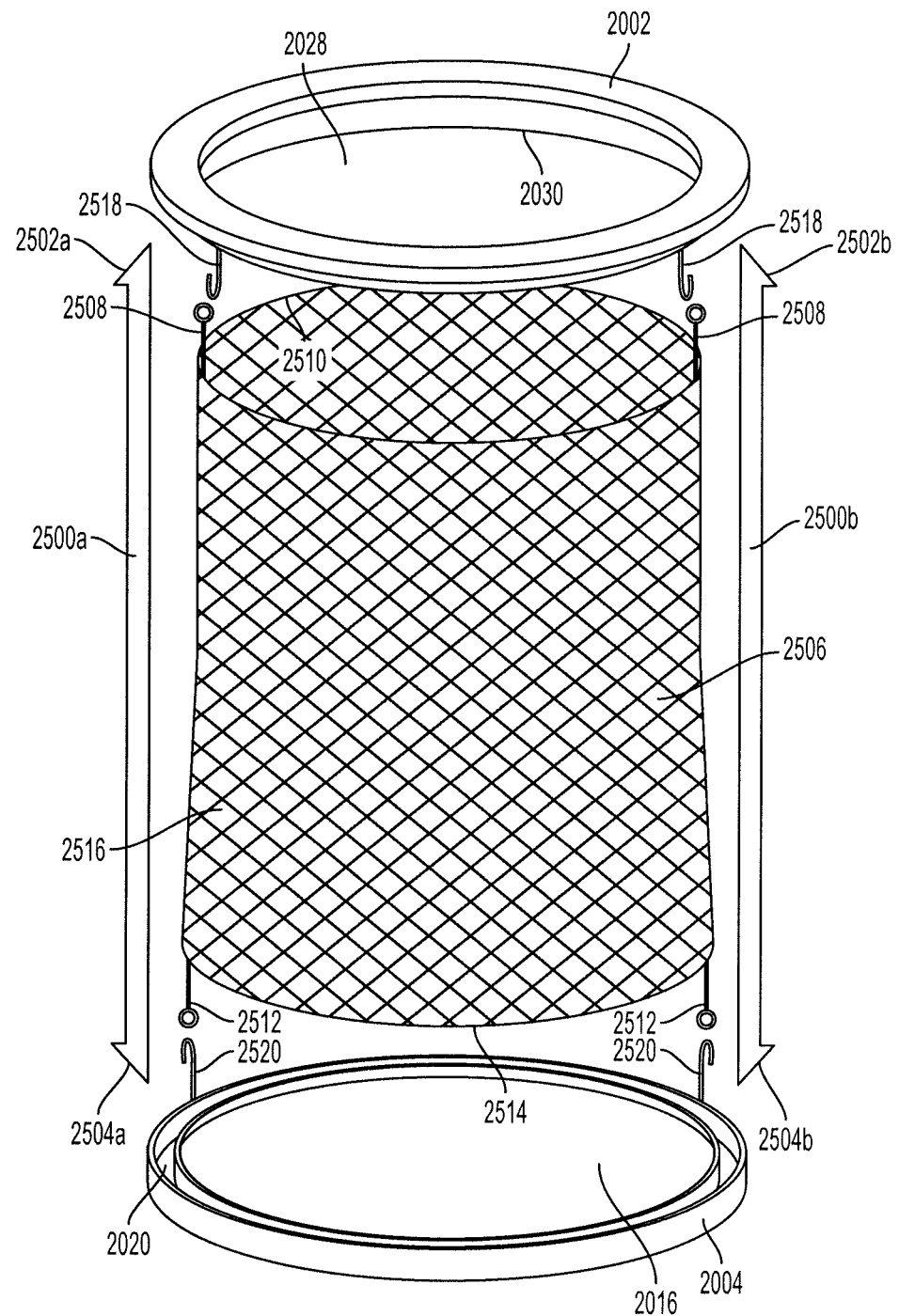
FIG. 25 illustrates an adaptable basket using a net attached to a top piece and a bottom piece according to an embodiment of the present invention.

FIG. 25 illustrates another adaptable basket 2600. The adaptable basket 2600 includes a top piece 2602 and a bottom piece 2604. The embodiment illustrated in FIG. 25 includes a first rod 2500a and a second rod 2500b. Any number of rods 2500 can be provided and in preferred embodiments, the number of rods 2500 ranges from 2 to 5. The rods 2500 may be formed from any material, such as metal, plastic, wood, hard rubber or the like. The rods 2500 may include at least one first connector 2502 and at least one second connector 2504. The first connector 2502 is adapted to attach the rods 2500 to the top piece 2602 and the second connector 2504 is adapted to attach the rods 2500 to the bottom piece 2604.

The first connector 2502 and the second connector 2504 can include a snap connector such as those illustrated in FIGS. 19A-A-19C, a spring clip, a button, a dowel, screw threading or the like. The rods 2500 may couple the top piece 2602 to the bottom piece 2604 at a distance. This creates a rigid skeleton that includes the top piece 2602, the bottom piece 2604 and the at least two rods 2500.

The embodiment illustrated in FIG. 25 also includes a net 2506. The net 2506 can be manufactured from any material suitable for netting, such as twine, polyester, vinyl or the like. The net 2506 includes at least one connector 2508 adapted to attach to the top piece 2602 or to an upper portion of the rods 2500 and/or to the at least one connector 2518 at the circumference 2626 of the top piece 2602. The at least one connector 2508 and/or 2518 may include, for example, a loop defined by the netting 2506, loose string adapted to tie around connectors on the top piece 2602, Velcro™, snap connectors, buttons, screw threading, or the like.

When the at least one connector 2508 are attached, an upper circumference 2510 of the net 2506 may be substantially aligned with the circumference 2626 of the top piece 2602. This allows most or all of the debris that enters the adaptable basket 2600 through the opening 2628 to be retained by the net 2506.

The net 2506 may also include connectors 2512 adapted to attach to connectors 2520 of the bottom piece 2604 and/or a bottom of the rods 2500. The connectors 2512 may be any type of connectors, such as those discussed above with reference to the at least one connector 2508. The connectors 2512, when attached, may cause a lower circumference 2514 of the net 2506 to be substantially aligned with a circumference 2614 of the bottom piece 2604, however, this is not necessary. In some embodiments, the connectors 2512 and/or 2520 may have a sole purpose of preventing a bottom of the net 2506 from floating upward. The connectors 2512 and/or 2520 may also or instead cause the net 2506 to substantially fill the perimeter of the skeleton formed by the top piece 2602, the bottom piece 2604 and the rods 2500.

The net 2506 is removably coupled to the adaptable basket 2600 and is thus easily replaceable. This allows for nets defining various sized openings to be swapped based on a target size of debris. Similarly, if a net becomes damaged, it can be replaced with a new net instead of replacement of the entire basket.

The adaptable basket 2600 provides similar benefits and advantages as the adaptable basket 100 of FIG. 1.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An adaptable basket for filtering debris comprising:
   a net apparatus including an annular structure and netting attached thereto;
   an annular bottom piece having a top, defining a slot having a vertical portion being open at the top and a horizontal portion separated from the top, and defining an annular cavity configured to receive the annular structure of the net apparatus; and
   an annular top piece having a horizontal component and a vertical component coupled to the horizontal component and including a tab extending from the vertical component and configured to be received by the vertical portion of the slot such that the adaptable basket can be assembled by positioning the annular structure of the net apparatus within the annular cavity of the annular bottom piece, positioning the annular top piece above the annular bottom piece such that the tab is received by the vertical portion of the slot, and rotating the annular top piece with respect to the annular bottom piece such that the tab is rotated away from the vertical portion of the slot.

2. The adaptable basket of claim 1 wherein the annular structure includes a bendable rod and the netting has a top end defining a loop configured to receive the bendable rod.

3. The adaptable basket of claim 1 wherein the annular bottom piece further defines a weight cavity configured to receive a material having a greater area density than the annular bottom piece.

4. The adaptable basket of claim 1 wherein the annular bottom piece further includes a retaining tab configured to be positioned over the annular cavity to reduce the likelihood of the annular structure of the net apparatus separating from the annular cavity.

5. The adaptable basket of claim 1 wherein the annular bottom piece has an outer surface and wherein the vertical portion and the horizontal portion of the slot are open at the outer surface of the annular bottom piece.

6. The adaptable basket of claim 1 wherein the vertical component of the annular top piece is coupled to an outer edge of the horizontal component of the annular top piece.

7. The adaptable basket of claim 6 wherein the tab extends radially inward from the vertical component of the annular top piece.

8. The adaptable basket of claim 1 further comprising a handle having a top end and a bottom end having a greater thickness than the top end and wherein the annular top piece defines an opening configured to receive the top end and having a diameter that is less than the thickness of the bottom end of the handle and greater than the thickness of the top end of the handle such that the top end of the handle can extend upwards through the opening.

9. The adaptable basket of claim 1 further comprising a pool vacuum attachment defining a hole and having an inner connector configured to connect the pool vacuum attachment to a pool vacuum hose and an outer connector and wherein the annular top piece defines an attachment connector configured to connect to the outer connector of the pool vacuum attachment such that the pool vacuum attachment can be positioned radially inward from the horizontal portion and the vertical portion of the annular top piece.

10. The adaptable basket of claim 1 wherein the annular top piece defines a hose connector configured to connect to a pool vacuum hose.

11. An adaptable basket for filtering debris comprising:
a first annular rigid portion having a top, a bottom and a first circumference and defining a plurality of holes and an area;
a second annular rigid portion having a top, a bottom and a second circumference that is smaller than the first circumference and defining a plurality of holes and an area;
a bottom portion extending radially inward from a bottom of the second annular rigid portion and substantially filling the area defined by the second annular rigid portion; and
a flexible portion coupled to the bottom of the first annular rigid portion and the top of the second annular rigid portion and being flexible such that the first annular rigid portion can move between a first location in which the bottom of the first annular rigid portion is near the top of the second annular rigid portion and a second location in which the bottom of the first annular rigid portion is near the bottom of the second annular rigid portion and at least a portion of the second annular rigid portion is positioned within the area defined by the first annular rigid portion.

12. The adaptable basket of claim 11 wherein the bottom portion defines a plurality of holes.

13. The adaptable basket of claim 11 wherein the adaptable basket further includes a connector configured to connect to at least one of a pool vacuum hose or a pool vacuum attachment capable of connecting to the pool vacuum hose.

14. An adaptable basket for filtering debris from a pool comprising:
an annular bottom piece having a top, a bottom and a connector;
an annular top piece having a top, a bottom and a connector and defining an opening; and
at least two side pieces each having:
a curved top having a first end, a second end and a connector configured to attach to the connector of the annular top piece,
a curved bottom having a first end, a second end and a connector configured to attach to the connector of the annular bottom piece,
a first edge extending from the first end of the curved top of the side piece to the first end of the curved bottom of the side piece,
a second edge extending from the second end of the curved top of the side piece to a second end of the curved bottom of the side piece, and
an outer portion substantially filling a curved plane defined between the curved top, the curved bottom, the first edge and the second edge and defining a mesh such that fluid can flow into the adaptable basket via the opening of the annular top piece and flow out of the adaptable basket through the mesh.

15. The adaptable basket of claim 14 wherein the connector of the annular bottom piece includes a cavity defining a cavity open towards the top of the annular bottom piece and a beveled edge tapering towards the top of the annular bottom piece.

16. The adaptable basket of claim 14 wherein the annular bottom piece defines a mesh within an area defined by the annular bottom piece such that fluid may flow through the mesh of the annular bottom piece.

17. The adaptable basket of claim 14 further comprising an adapter having a connector and a diameter and wherein the annular top piece has a diameter that is smaller than the diameter of the adapter and further includes a second connector configured to attach to the connector of the adapter such that when connected, the adapter allows the adaptable basket to be used in a pool cavity having an upper diameter similar to the diameter of the adapter.

18. The adaptable basket of claim 14 further comprising a weir having at least two pieces coupled together and configured to be positioned within the opening defined by the annular top piece.

19. The adaptable basket of claim 14 wherein the annular top piece includes a second connector configured to be connected to a pool vacuum hose.

20. An adaptable basket for filtering debris comprising:
an annular bottom piece having a top, a bottom and at least two rod connectors;
an annular top piece having a top, a bottom, at least two rod connectors and a net connector and defining an opening;
at least two rods each having a top coupled to a top connector configured to connect to one of the at least two rod connectors of the annular top piece, a bottom coupled to a bottom connector configured to connect to one of the at least two rod connectors of the annular bottom piece; and
a net configured to connect to the net connector of the annular top piece and be positioned within an area defined between the annular top piece, the annular bottom piece and the at least two rods such that fluid may flow into the adaptable basket through the opening defined by the annular top piece and out of the adaptable basket through the net.

* * * * *